(12) United States Patent
Samson et al.

(10) Patent No.: US 9,763,428 B2
(45) Date of Patent: Sep. 19, 2017

(54) HOLDER APPARATUS FOR AVIAN BIRDS, AND ASSOCIATED METHOD

(71) Applicant: Zoetis Services LLC, Florham Park, NJ (US)

(72) Inventors: William Douglas Samson, Durham, NC (US); Daniel Lee Kennedy, Wake Forest, NC (US)

(73) Assignee: Zoetis Services LLC, Parsippany, NJ (US)

( * ) Notice: Subject to any disclaimer, the term of this patent is extended or adjusted under 35 U.S.C. 154(b) by 291 days.

(21) Appl. No.: 14/543,143

(22) Filed: Nov. 17, 2014

(65) Prior Publication Data

US 2015/0144071 A1    May 28, 2015

Related U.S. Application Data

(60) Provisional application No. 62/038,904, filed on Aug. 19, 2014, provisional application No. 61/908,197, filed on Nov. 25, 2013.

(51) Int. Cl.
*A01K 37/00* (2006.01)
*A61D 1/02* (2006.01)

(52) U.S. Cl.
CPC .............. *A01K 37/00* (2013.01); *A61D 1/025* (2013.01)

(58) Field of Classification Search
CPC ........ A01K 37/00; A01K 31/07; A01K 45/00; A01K 45/005
USPC ................. 119/713, 714, 489, 490
See application file for complete search history.

(56) References Cited

U.S. PATENT DOCUMENTS

| 1,109,772 | A | * | 9/1914 | Leyh | A01K 37/00 |
| | | | | | 119/714 |
| 2,107,484 | A | | 2/1938 | Lesher | |
| 2,319,938 | A | | 5/1943 | Markins | |
| 3,080,850 | A | * | 3/1963 | Schrougham | A01K 15/02 |
| | | | | | 119/427 |
| 3,234,915 | A | * | 2/1966 | Sanders | A01K 45/005 |
| | | | | | 119/401 |
| 3,260,239 | A | * | 7/1966 | Sanders | A01K 45/005 |
| | | | | | 119/401 |
| 3,774,578 | A | * | 11/1973 | Randolph | A01K 37/00 |
| | | | | | 119/714 |

(Continued)

FOREIGN PATENT DOCUMENTS

| ES | 2150839 B1 | 8/2001 |
| FR | 2808671 A1 | 11/2001 |

(Continued)

OTHER PUBLICATIONS

PCT International Search Report and the Written Opinion, International Application No. PCT/US2014/066581, Date of Mailing Feb. 26, 2015.

*Primary Examiner* — Kristen C Hayes
(74) *Attorney, Agent, or Firm* — Scott C. Mayhew

(57) ABSTRACT

A positioning device for presenting an avian bird is provided. Such a positioning device includes a frame and a plurality of positioning assemblies engaged with the frame. The positioning assemblies are configured to entirely support and restrain an avian bird in a flight-replicated position such that the avian bird is presented for various reasons, such as undergoing a vaccine delivery procedure, evaluation, or any other process. An associated method is also provided.

15 Claims, 33 Drawing Sheets

(56) References Cited

U.S. PATENT DOCUMENTS

| | | |
|---|---|---|
| 4,674,490 A | 6/1987 | Frankel et al. |
| 4,681,565 A | 7/1987 | Gourlandt |
| 4,850,997 A | 7/1989 | DuBose |
| 4,863,443 A | 9/1989 | Hornung |
| 4,951,610 A | 8/1990 | Gourlandt |
| 5,311,841 A | 5/1994 | Thaxton |
| 5,312,353 A | 5/1994 | Boggess et al. |
| 5,468,227 A | 11/1995 | Haskell |
| 6,558,352 B1 | 5/2003 | Hogan |
| 6,565,533 B1 | 5/2003 | Smith et al. |
| 6,609,479 B2 | 8/2003 | Storer et al. |
| 6,634,319 B1 | 10/2003 | Zermoglio et al. |
| 6,789,467 B2 | 9/2004 | Johnston, Jr. et al. |
| 6,857,215 B1 | 2/2005 | Rickrode |
| 6,866,847 B1 | 3/2005 | Kelly-Aehle |
| 7,004,112 B2 | 2/2006 | Gorans |
| 7,232,450 B2 | 6/2007 | Gorans et al. |
| 7,802,541 B2 | 9/2010 | Jones et al. |
| 7,850,665 B2 | 12/2010 | Johnston, Jr. et al. |
| 8,211,058 B2 * | 7/2012 | Jorna ............ A61D 1/025 119/713 |
| 8,499,721 B2 | 8/2013 | Gorans et al. |
| 8,794,185 B2 | 8/2014 | Lee |
| 2003/0043043 A1 | 3/2003 | Hogan |
| 2007/0093747 A1 | 4/2007 | Smith |
| 2011/0313409 A1 | 12/2011 | Erickson et al. |
| 2012/0012070 A1 * | 1/2012 | Gorans ............ A01K 1/0613 119/713 |
| 2012/0197181 A1 | 8/2012 | Grosbois et al. |
| 2014/0031790 A1 | 1/2014 | Johnson |

FOREIGN PATENT DOCUMENTS

| | | |
|---|---|---|
| FR | 2883157 A1 | 9/2006 |
| FR | 2885030 A1 | 11/2006 |
| WO | WO 2014/107766 A1 | 7/2014 |
| WO | WO 2014/139837 A1 | 9/2014 |
| WO | WO 2014/170325 A1 | 10/2014 |

* cited by examiner

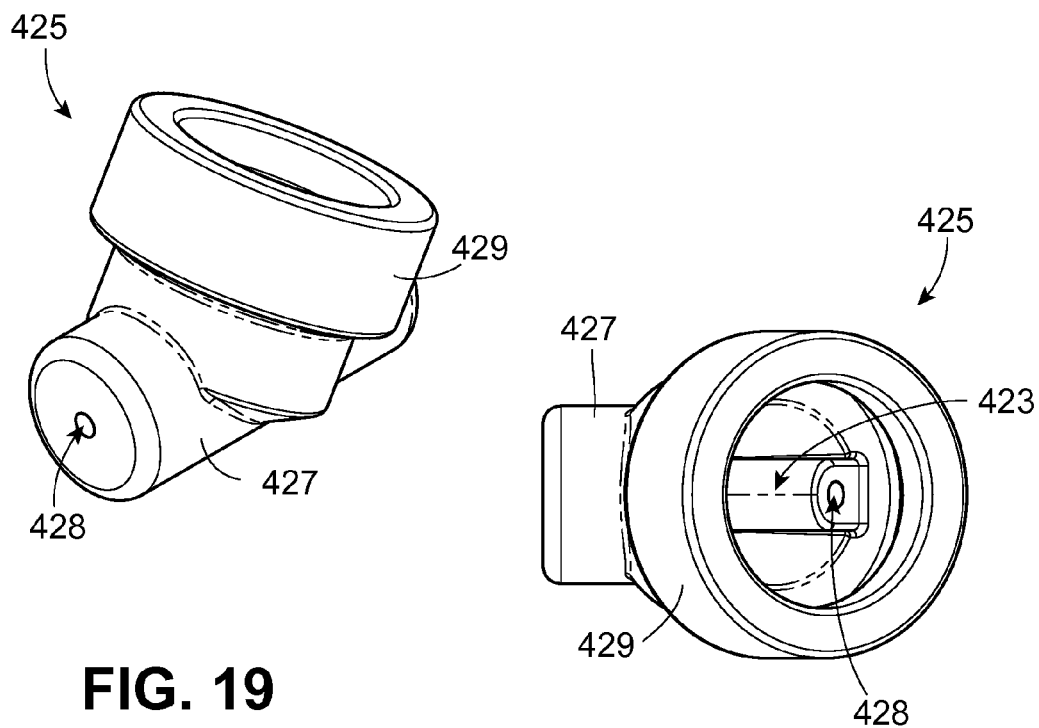
FIG. 19
FIG. 20
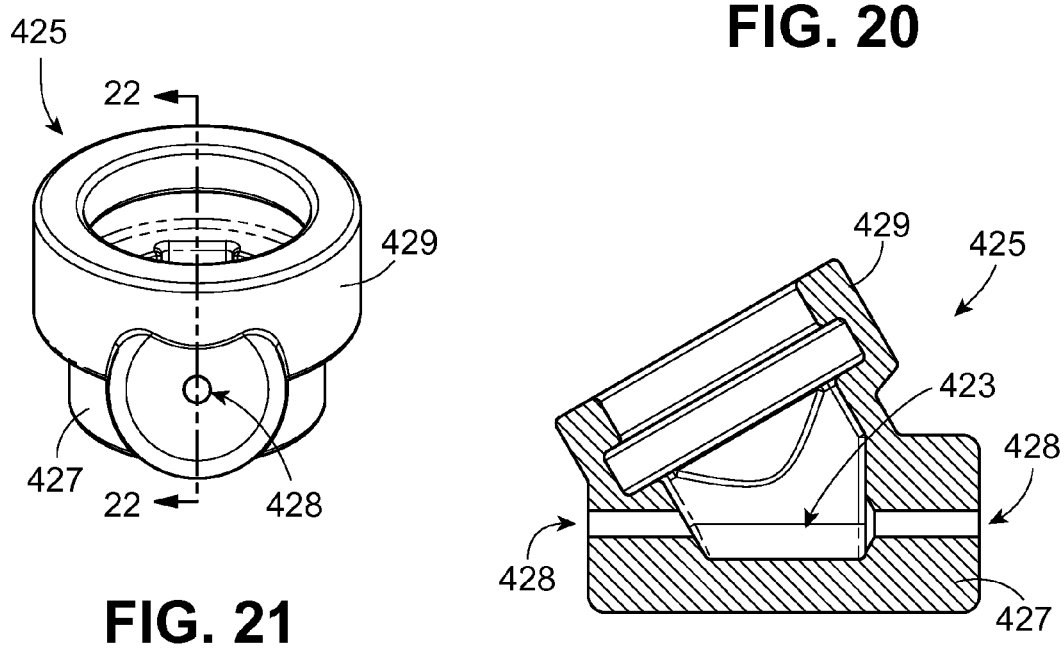
FIG. 21
FIG. 22

HOLDER APPARATUS FOR AVIAN BIRDS, AND ASSOCIATED METHOD

CROSS REFERENCE TO RELATED APPLICATIONS

This application claims the benefit of U.S. Provisional Patent Application Nos. 61/908,197, filed Nov. 25, 2013, and 62/038,904, filed Aug. 19, 2014, both of which are expressly incorporated herein by reference in their entirety.

TECHNICAL FIELD

The present disclosure generally relates to restraining devices for animals. More particularly, the present disclosure relates to a holder apparatus for presenting an avian bird, and an associated method.

BACKGROUND

Typically, poultry birds that are raised for protein, egg-laying or breeding purposes may be vaccinated post-hatch against a variety of diseases and parasites. Such vaccinations may prevent debilitation or mortality, while optimizing bird growth and productivity. In many instances, the vaccines or other medicines may be administered manually. This can be done by capturing individual birds and presenting the individual birds to a vaccination device, as disclosed in U.S. Pat. No. 7,802,541 to Jones et al. and U.S. Pat. No. 8,211,058 to Jorna. The presenting of the bird to the vaccination device may be accomplished manually or with assistance from a restraining device in some form.

In other instances, vaccination may be accomplished by presenting the birds for manual inoculation by means of a rotatable drum, as disclosed in U.S. Pat. No. 6,609,479 to Storer et al. In such a configuration, each bird is shackled to the drum and injected with different vaccines or medicines at separate workstations by individual operators. Other types of restraining devices have been used for holding avian birds, such as U.S. Pat. No. 2,107,484 to Lesher. However, the previously mentioned restraining devices and holders do not provide optimal, unassisted and full access to the various parts of an avian bird for evaluation, vaccination, or other processing needs.

Accordingly, it would be desirable to provide a holder apparatus capable of presenting an avian bird such that a substantial portion of the avian bird may be easily accessed, while the avian bird remains stabilized under comfortable conditions. Furthermore, it would be desirable to provide an associated method that would facilitate presentation of an avian bird within a holder apparatus in such a manner that the avian bird is stabilized and comfortable.

BRIEF SUMMARY

The above and other needs are met by aspects of the present disclosure which, according to one aspect, provides a positioning device for presenting an avian bird. The positioning device includes a frame and a plurality of positioning assemblies operably engaged with the frame. The positioning assemblies are configured to entirely support and restrain an avian bird in a flight-replicated position.

Another aspect provides a positioning device for presenting an avian bird. The positioning device includes a frame and means for supporting and restraining entirely an avian bird in a flight-replicated position on the frame.

Yet another aspect provides a method of presenting an avian bird. The method comprises providing a positioning device having a frame and a plurality of positioning assemblies operably engaged with the frame. The positioning assemblies are configured to entirely support and restrain an avian bird in a flight-replicated position. The method further comprises positioning an avian pullet within the positioning device.

Thus, various aspects of the present disclosure provide advantages, as otherwise detailed herein.

BRIEF DESCRIPTION OF THE DRAWINGS

Figure 1:
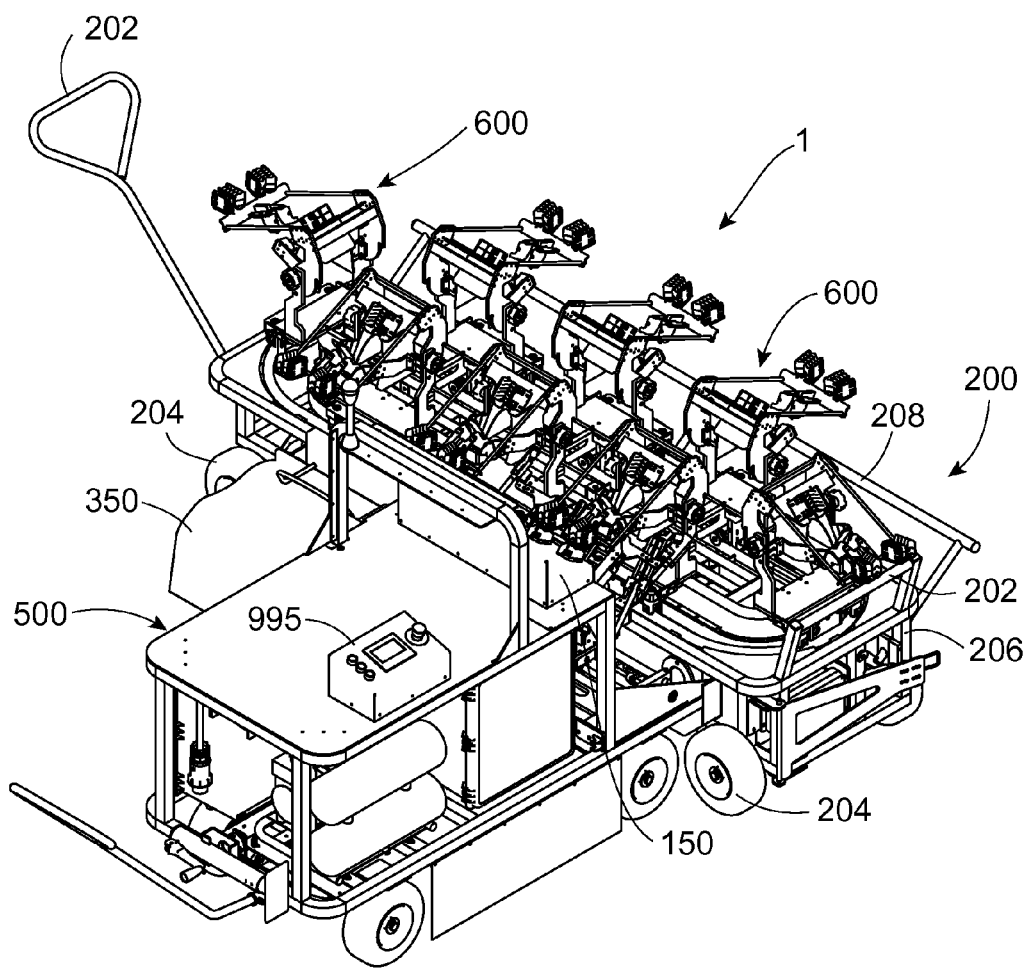
Figure 2:
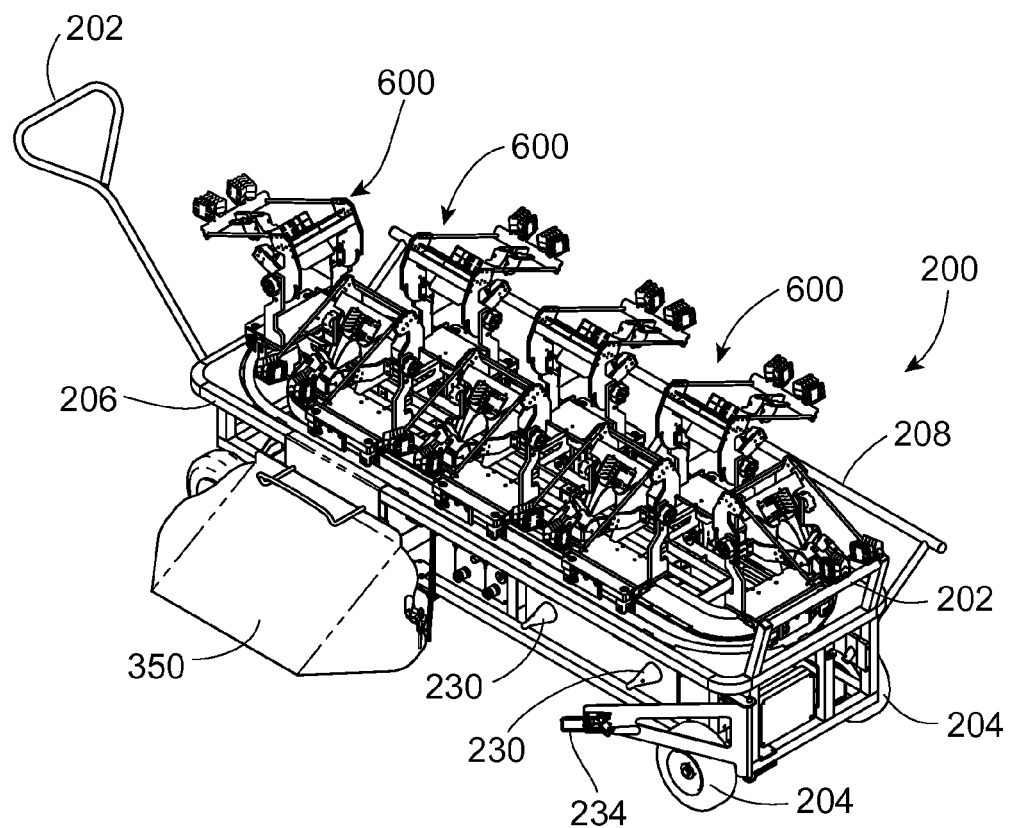
Figure 3:
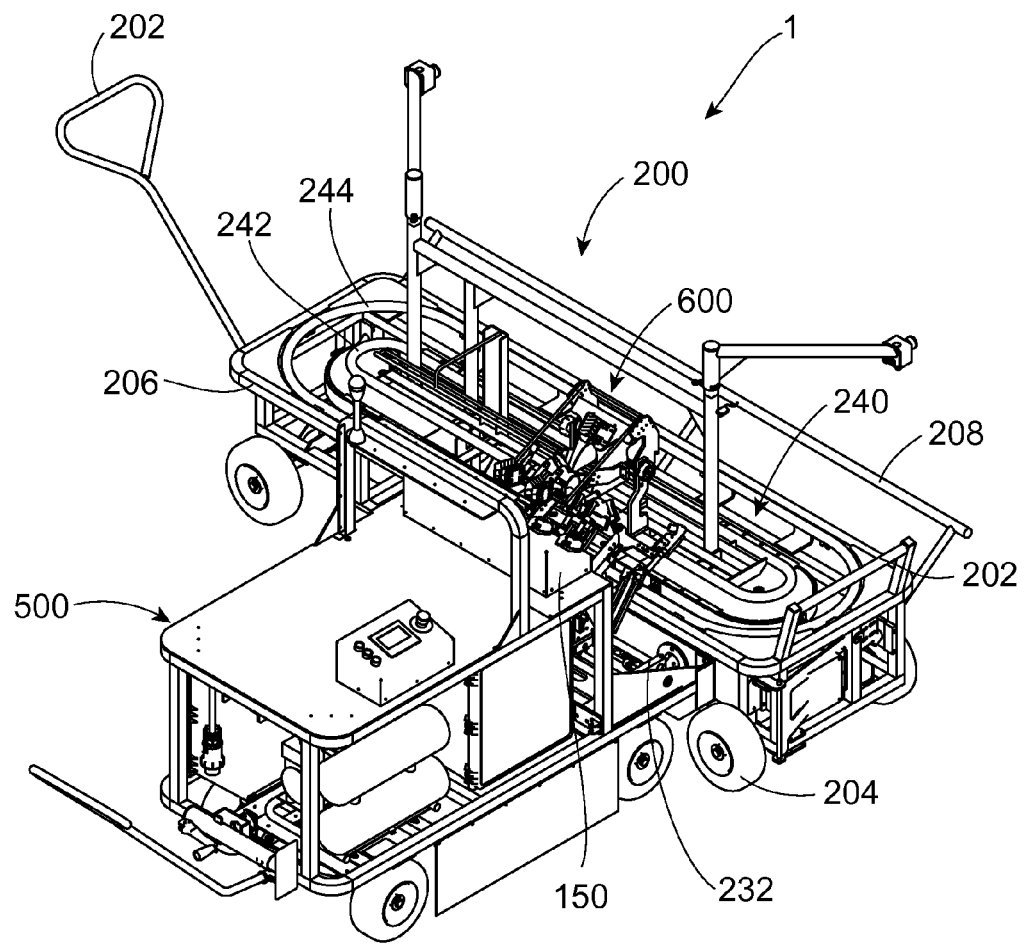
Figure 4:
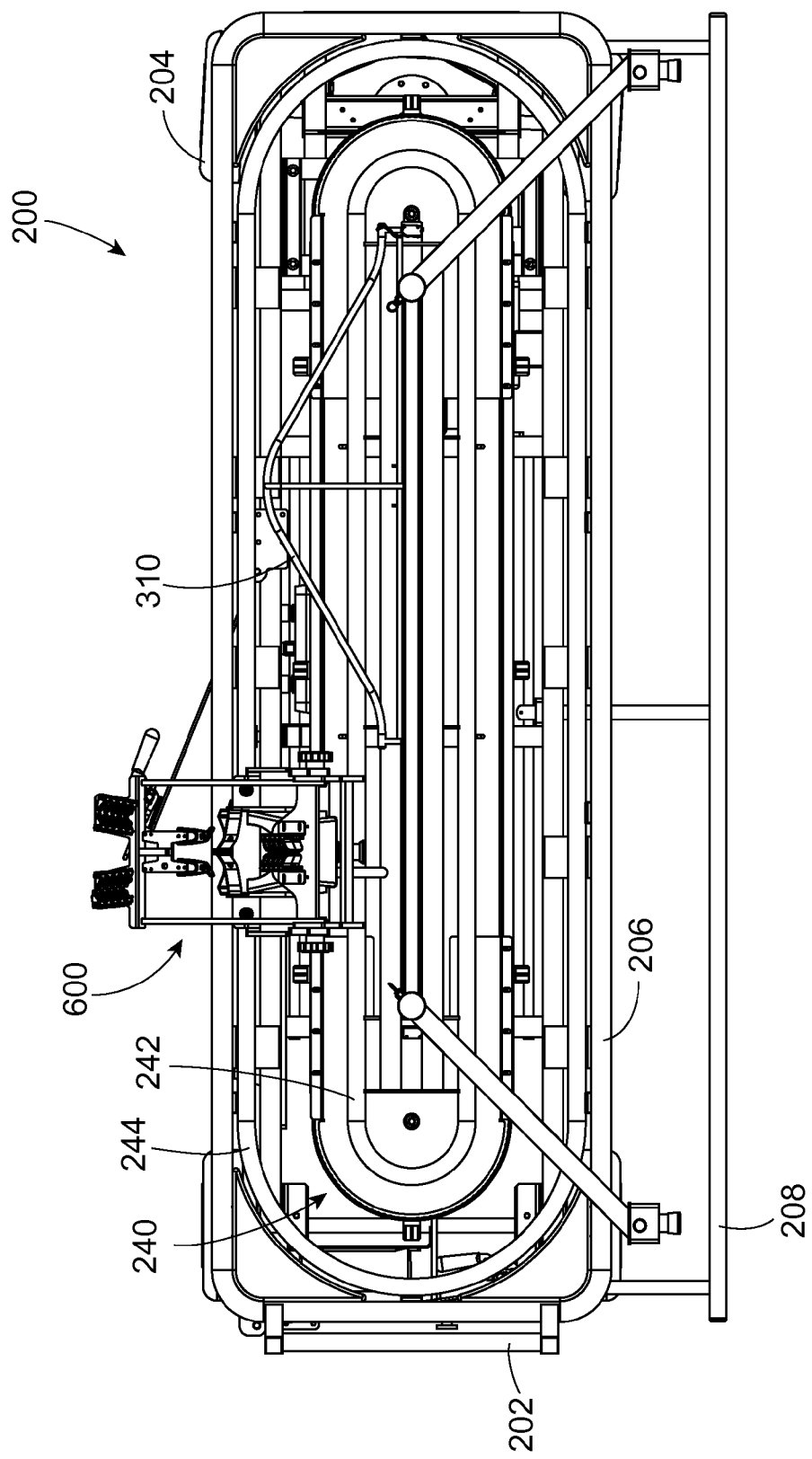
Figure 5:
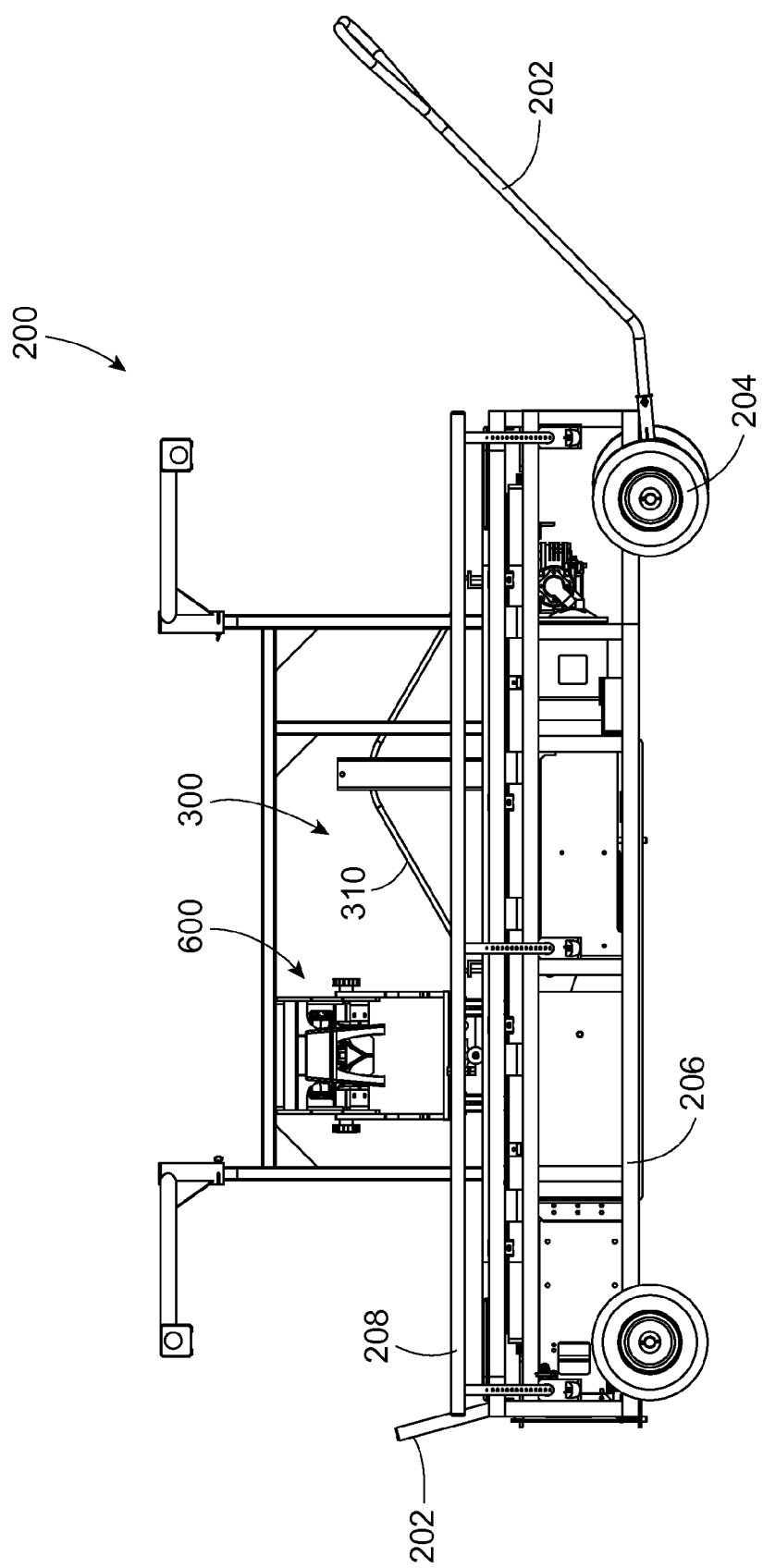
Figure 6:
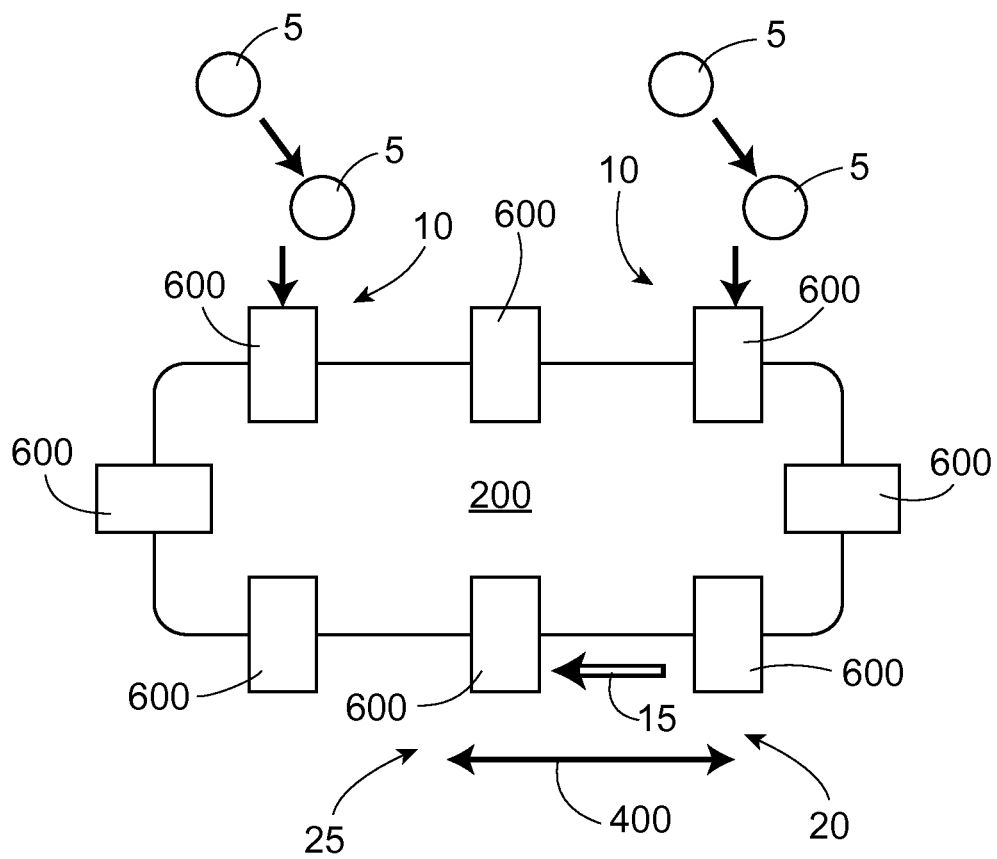
Figure 7:
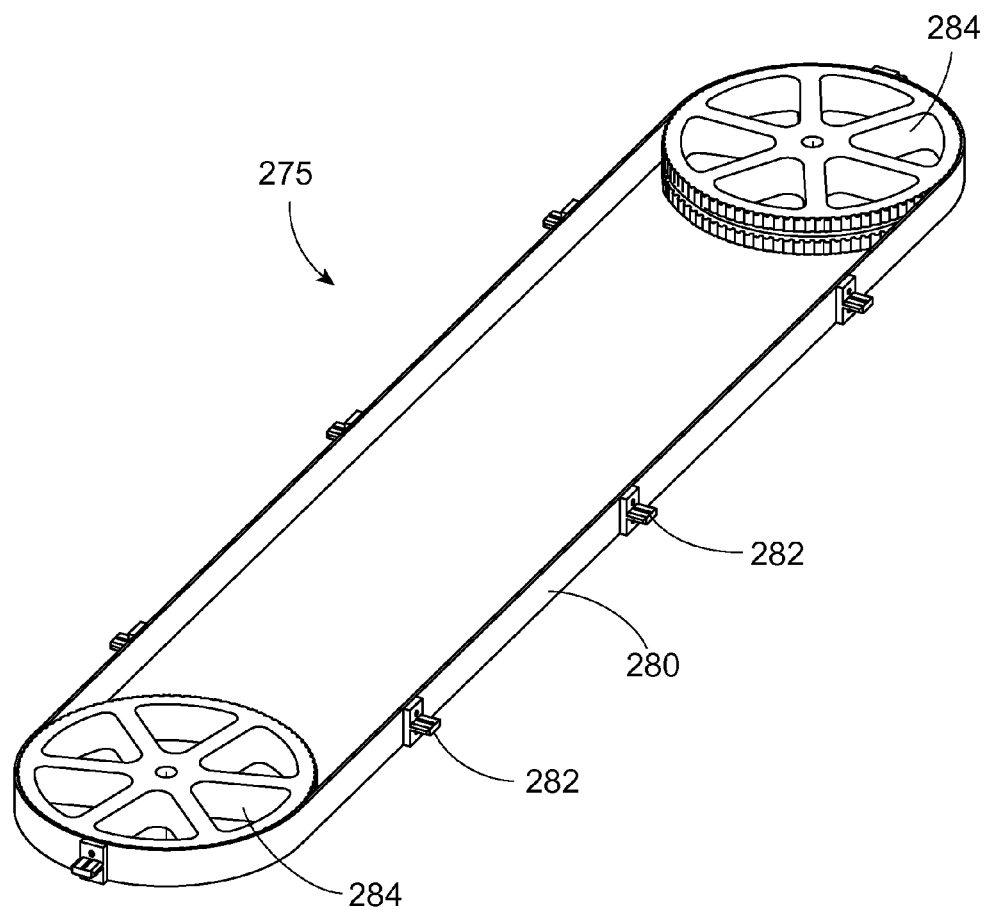
Figure 8:
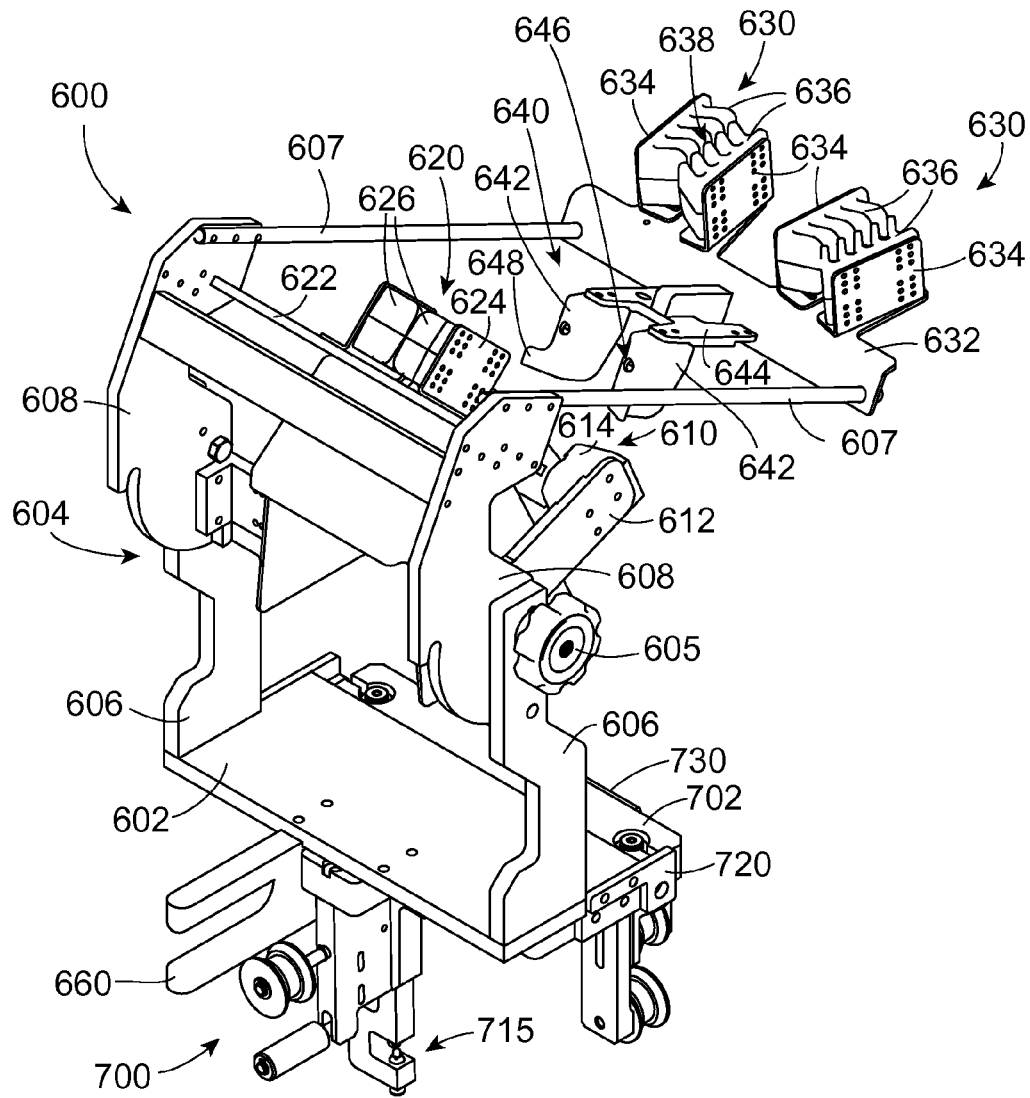
Figure 9:
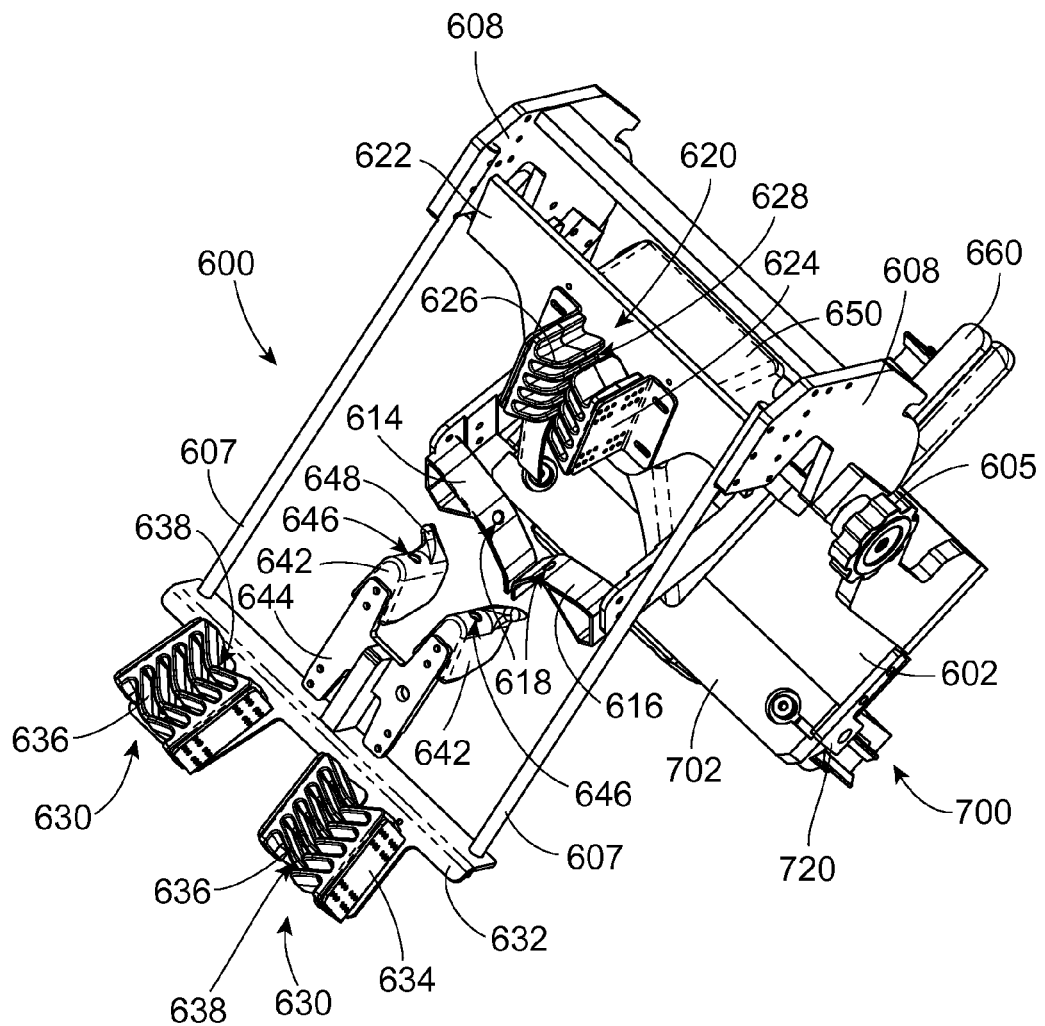
Figure 10:
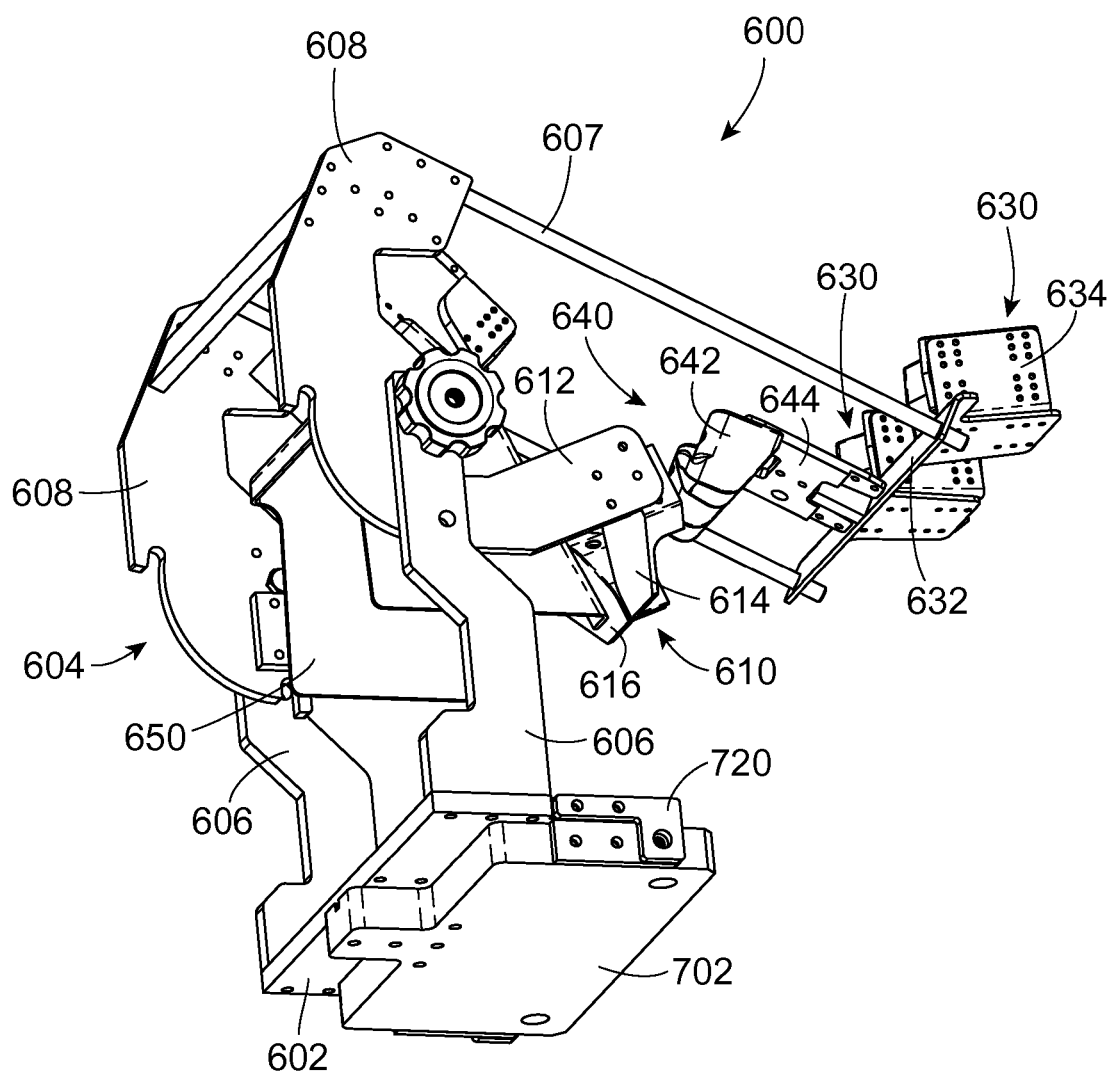
Figure 11:
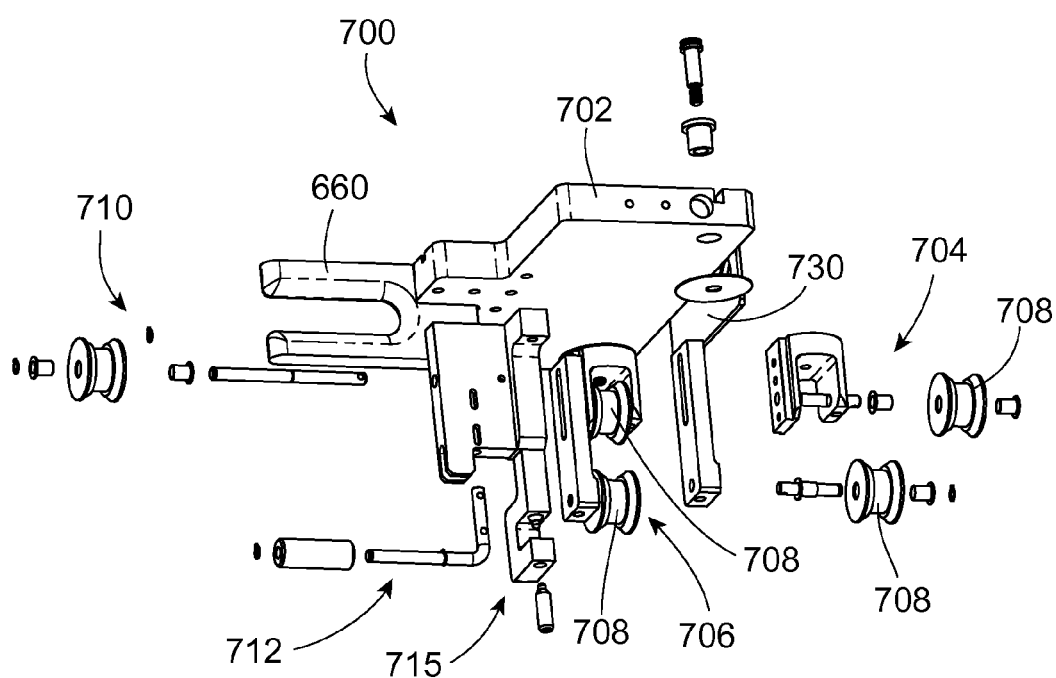
Figure 12:
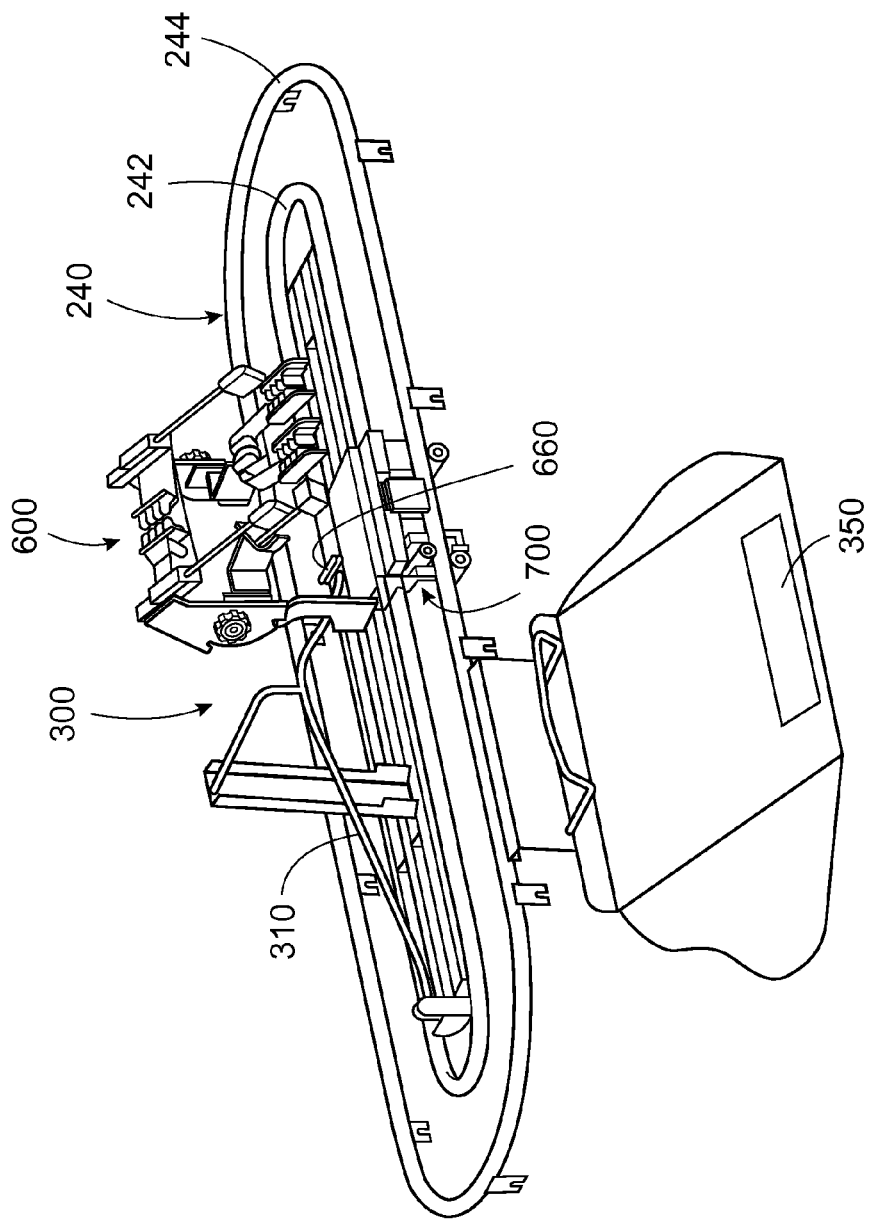
Figure 13:
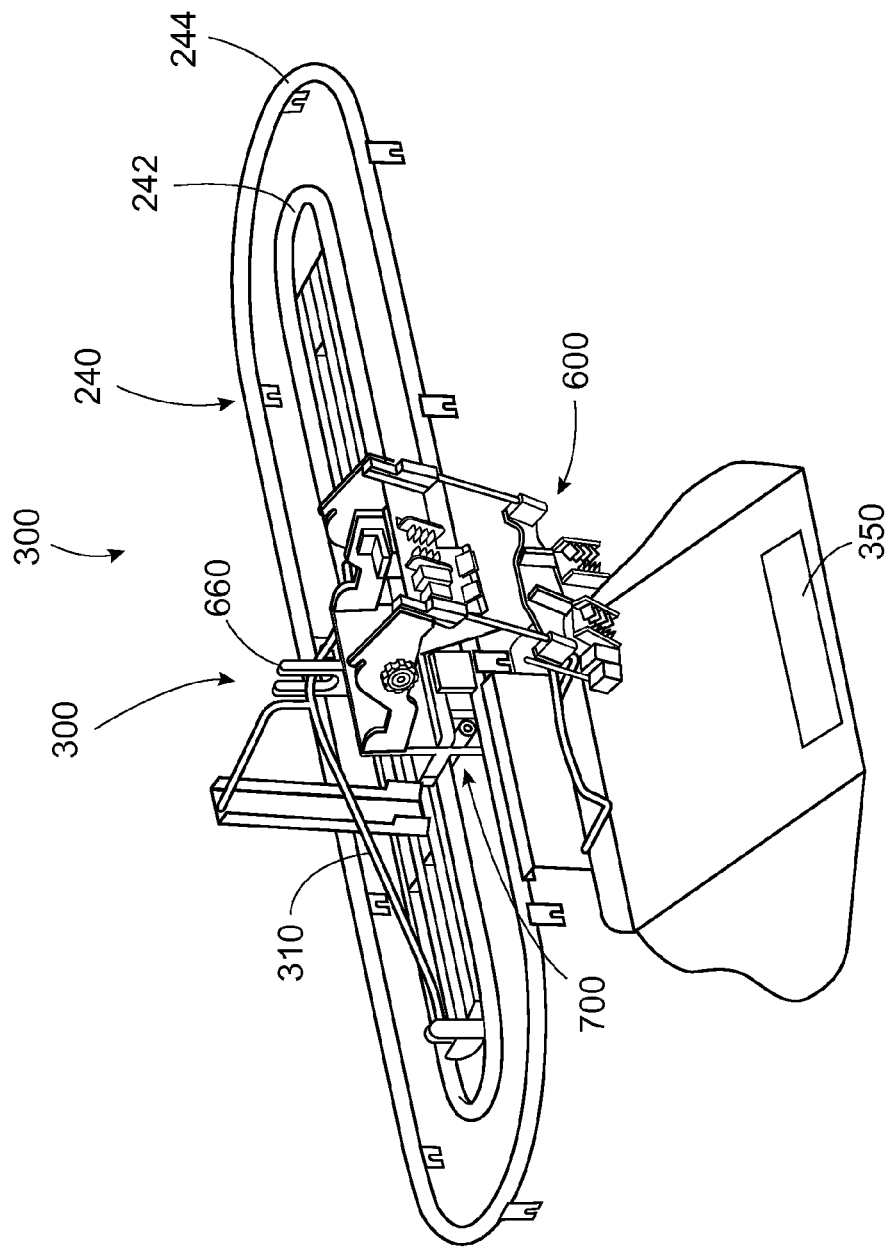
Figure 14:
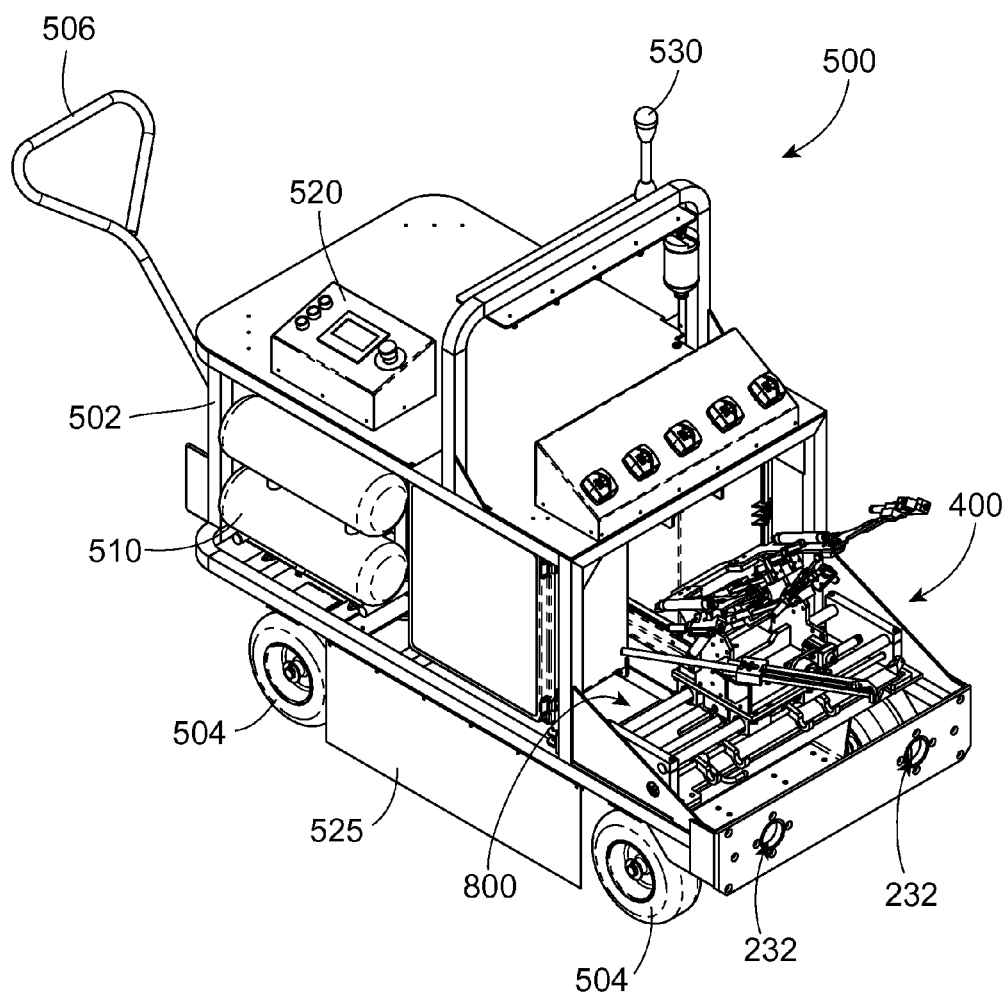
Figure 15:
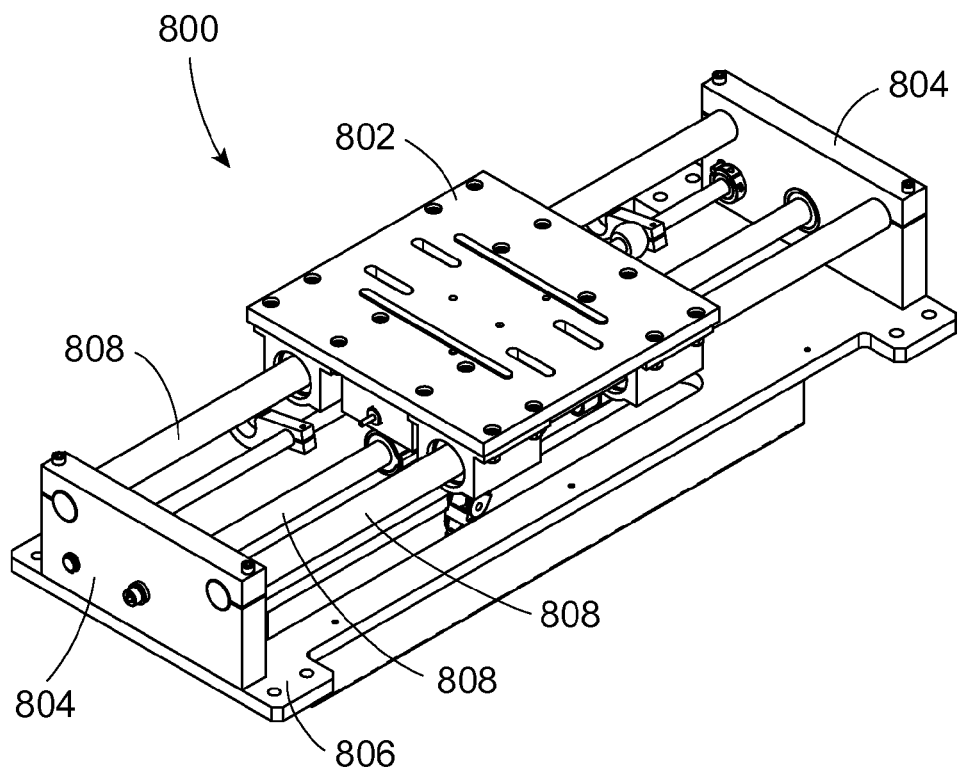
Figure 16:
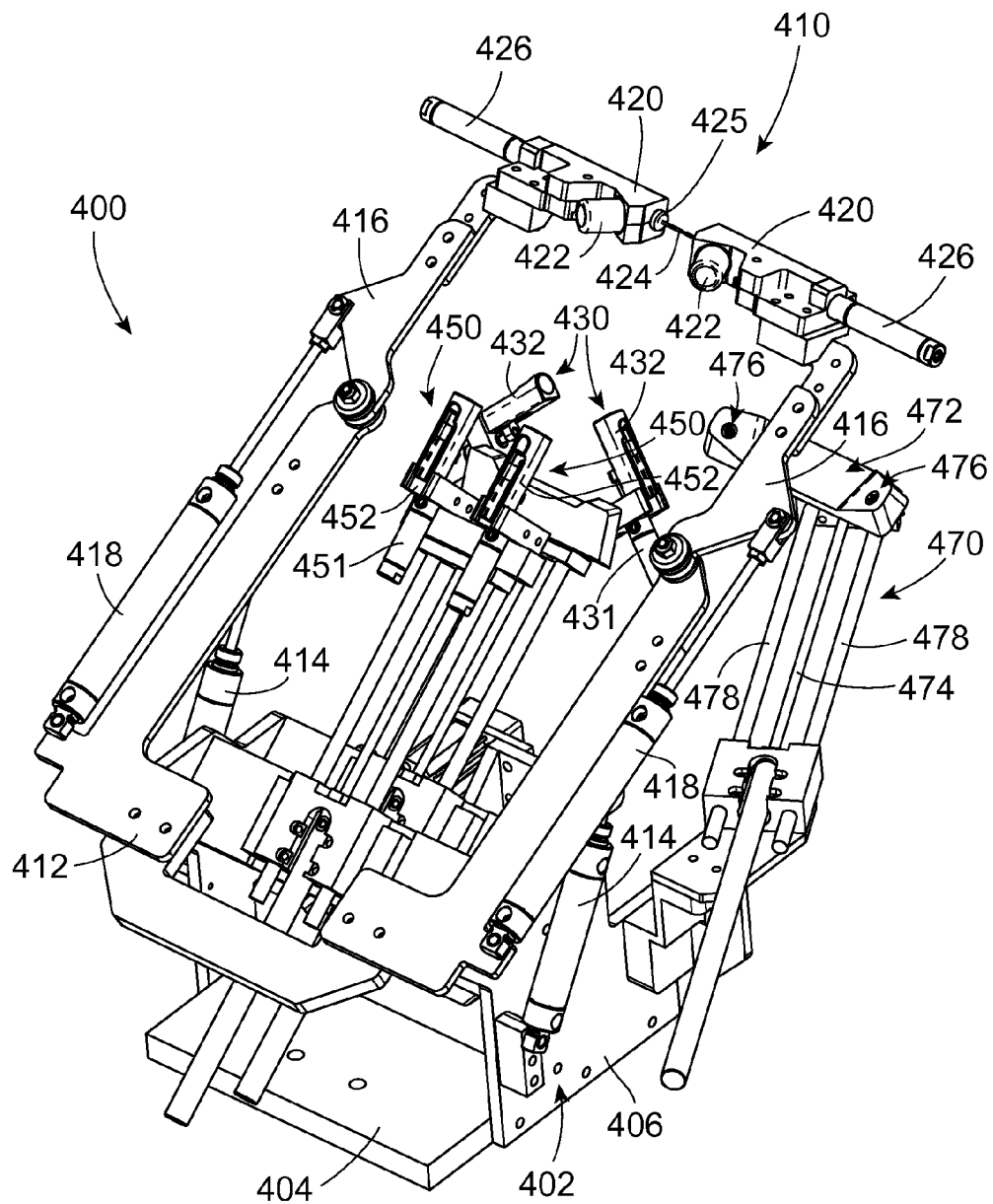
Figure 17:
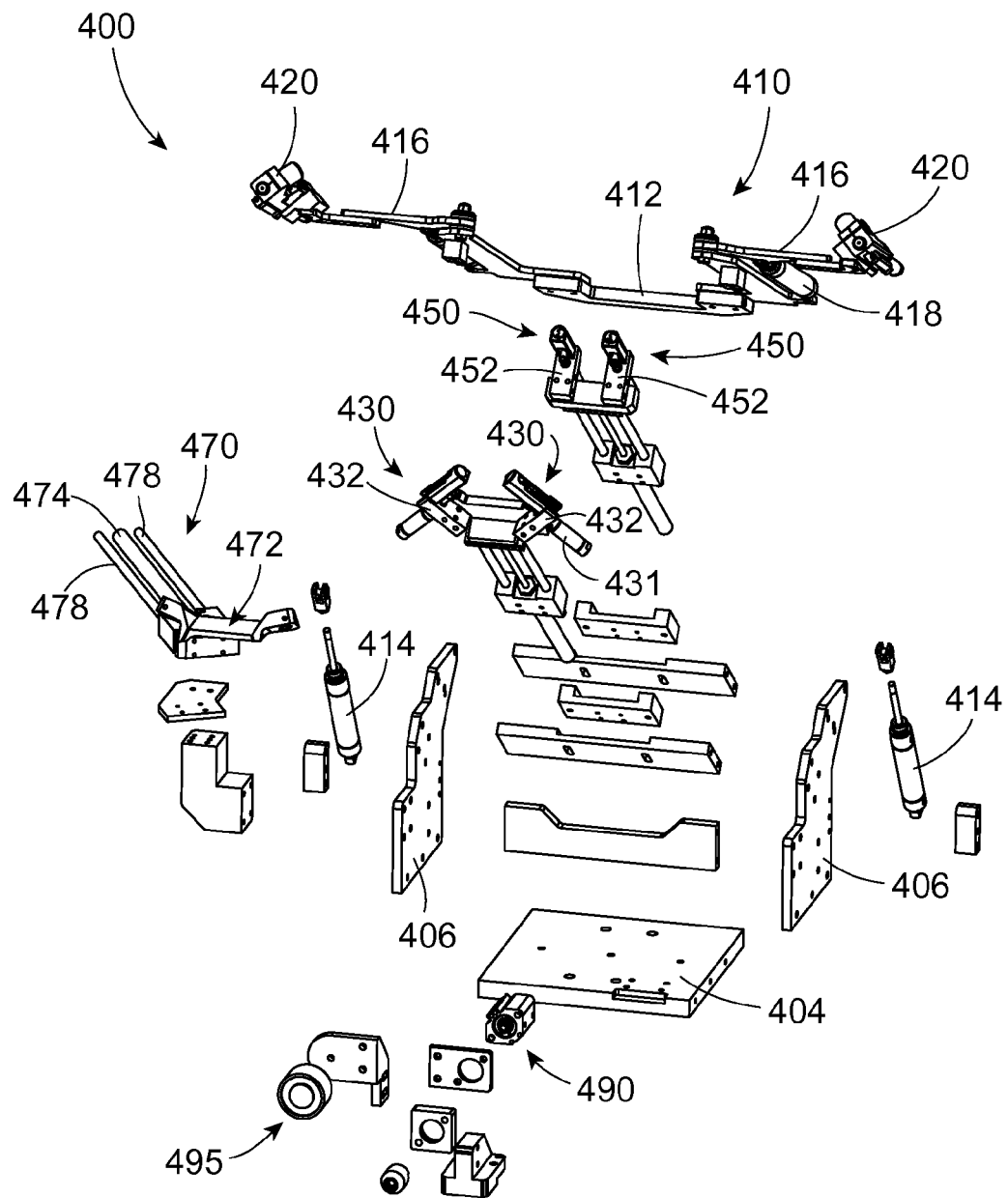
Figure 18:
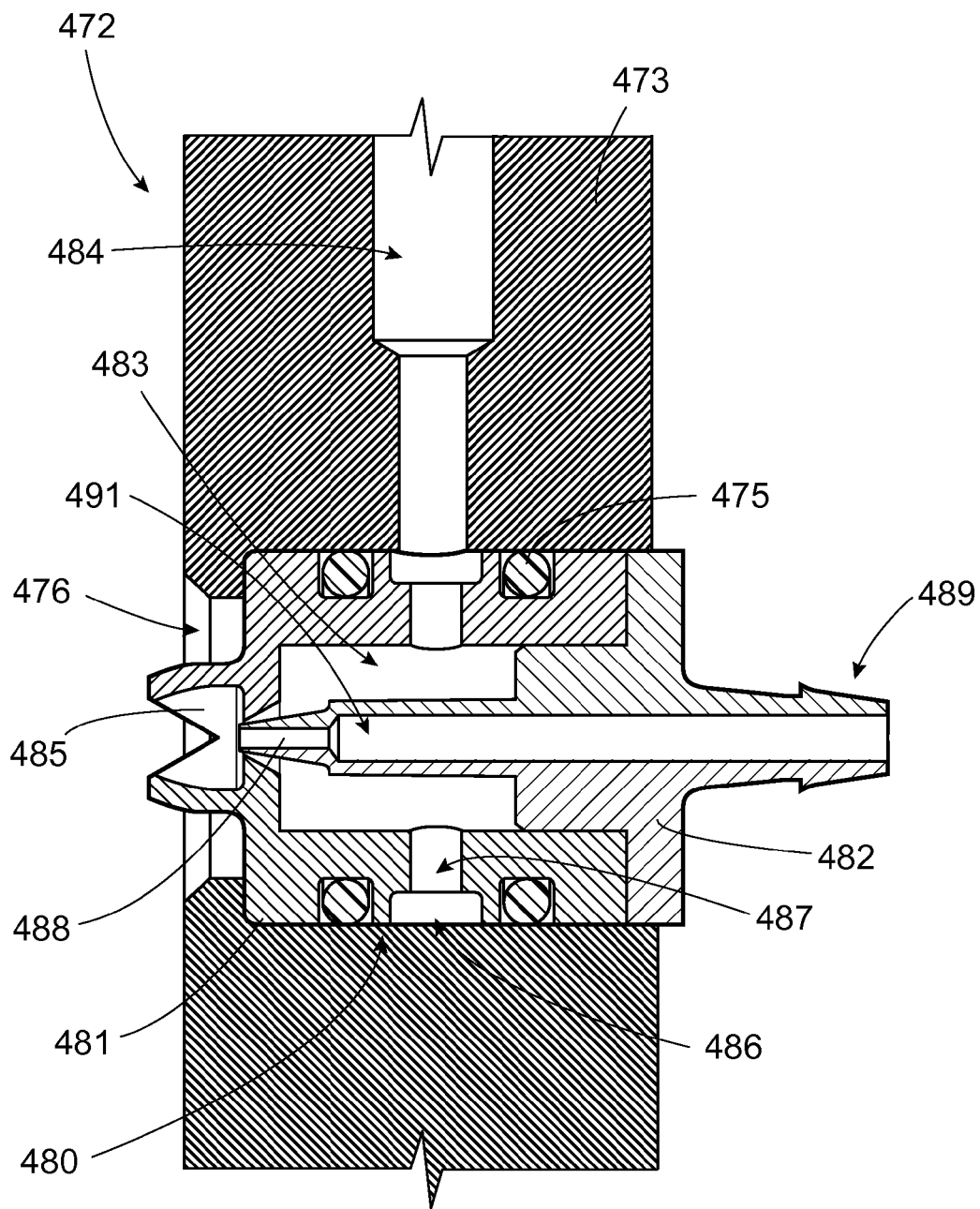
Figure 23:
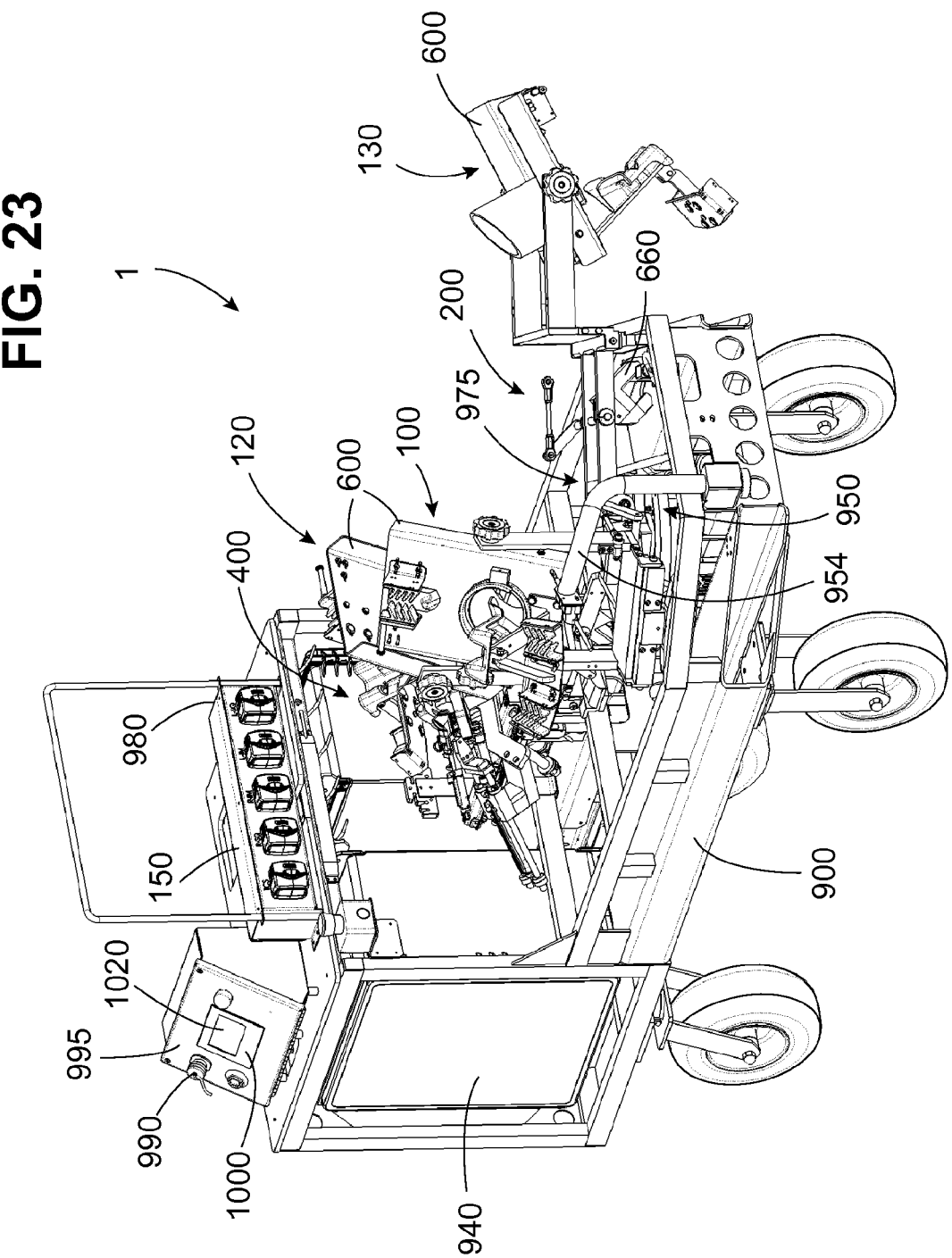
Figure 24:
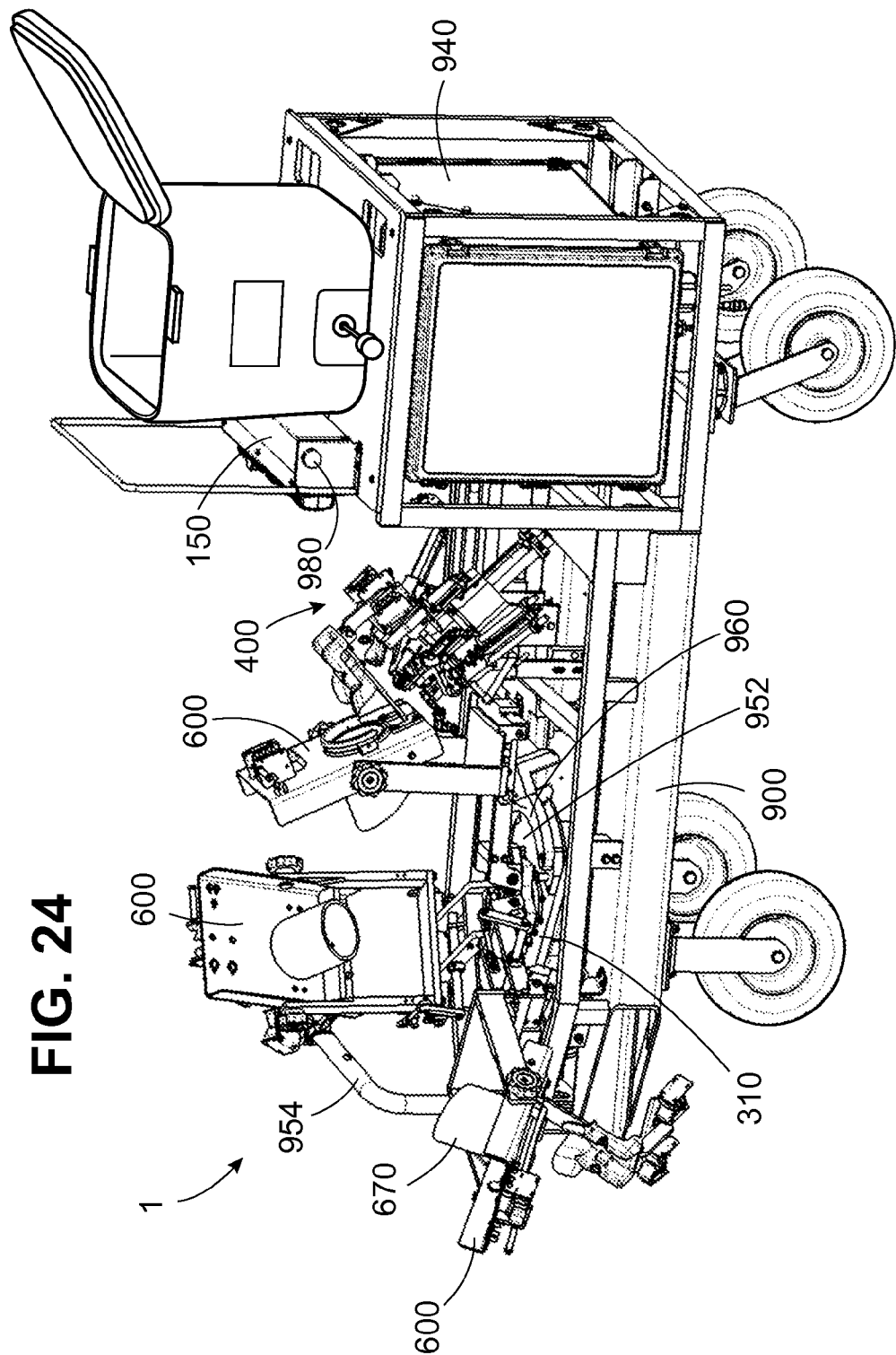
Figure 25:
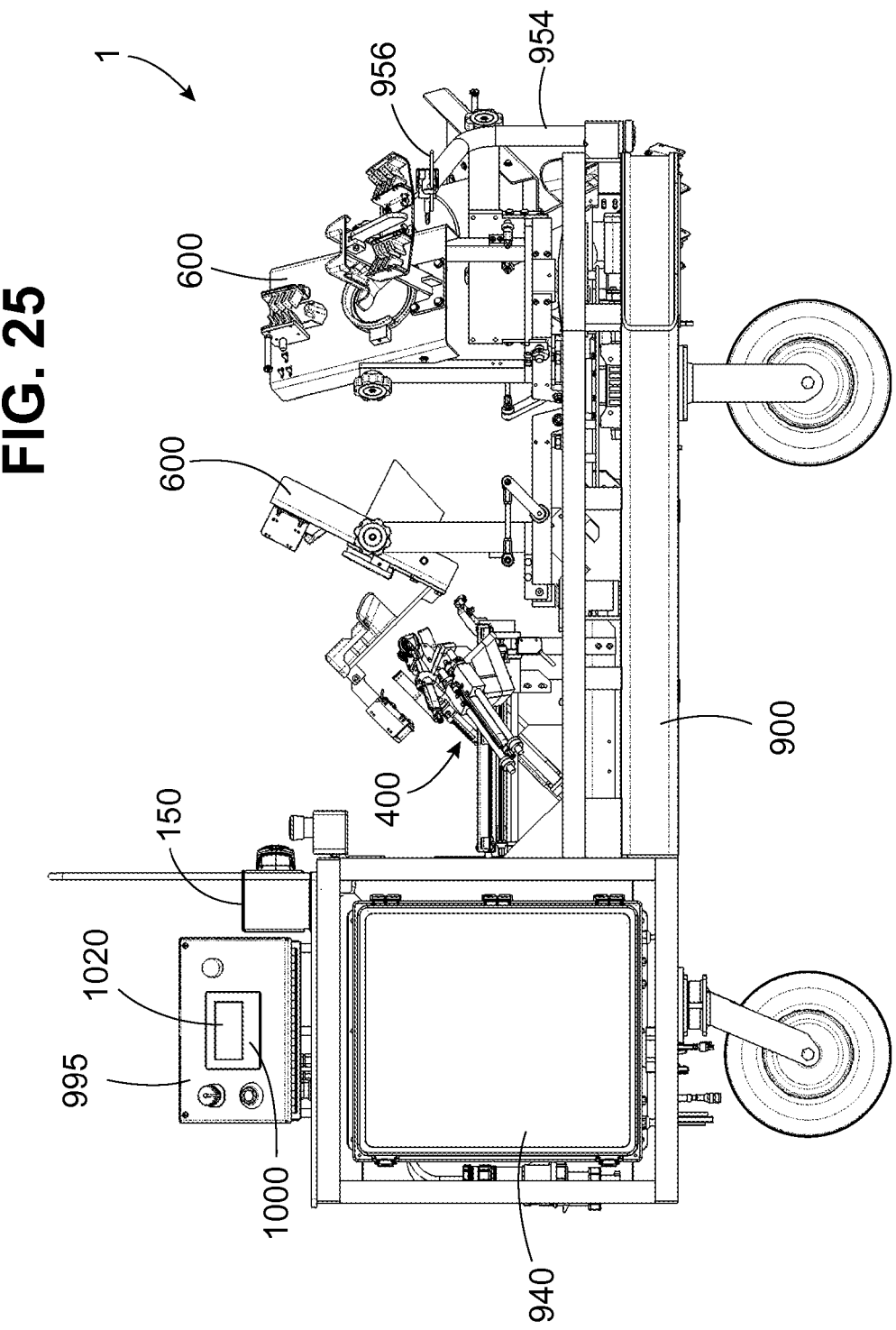
Figure 26:
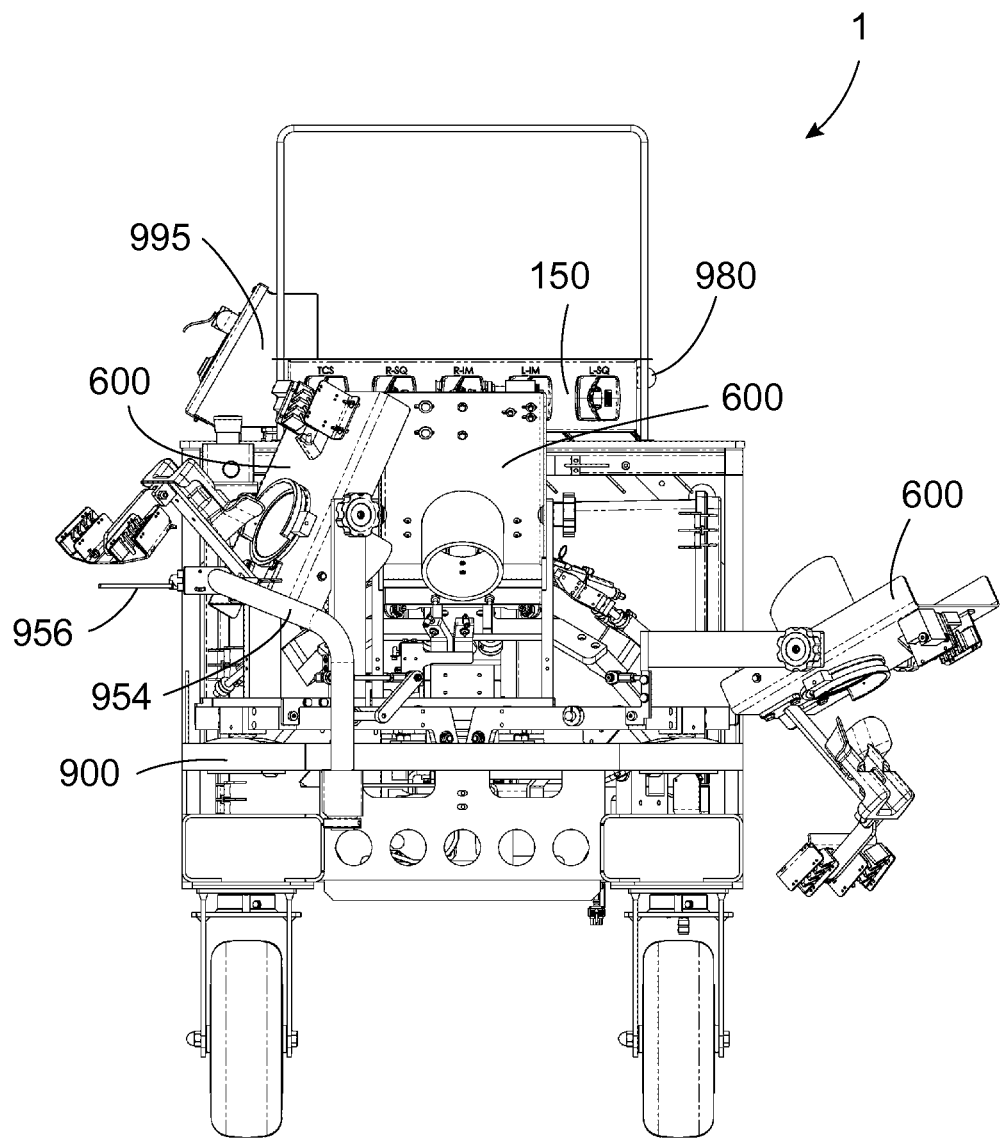
Figure 27:
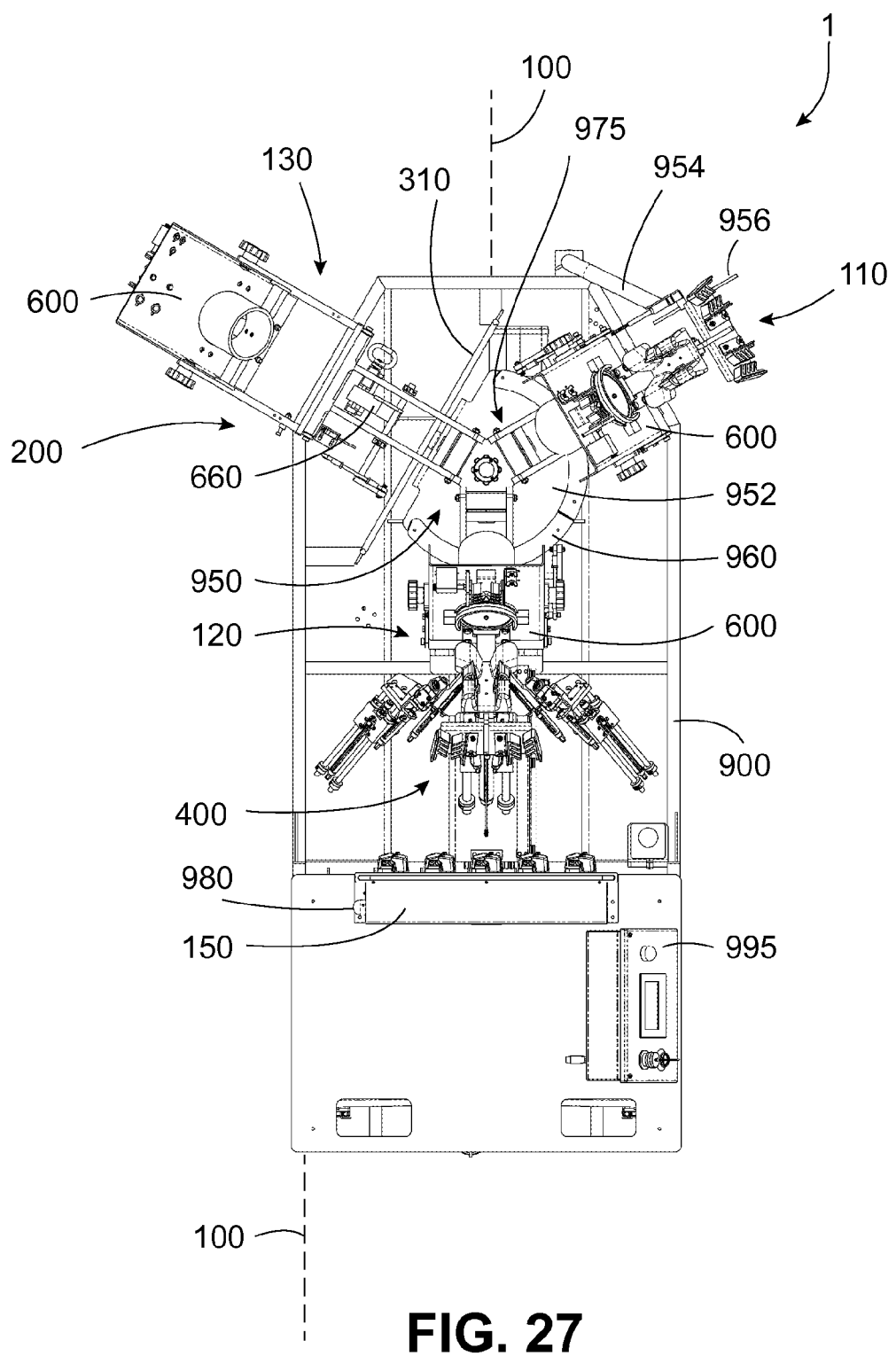
Figure 28:
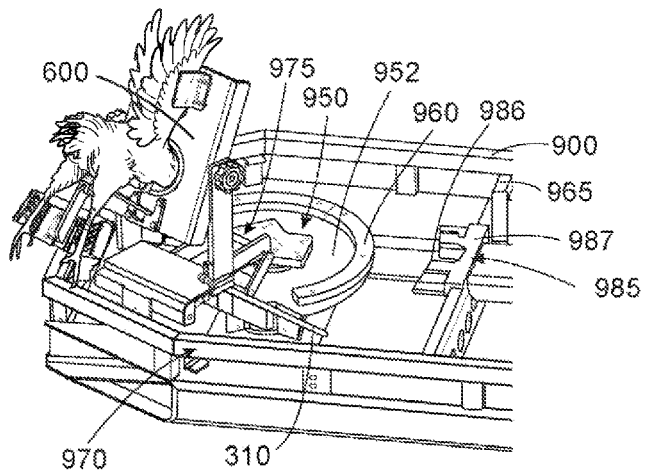
Figure 29:
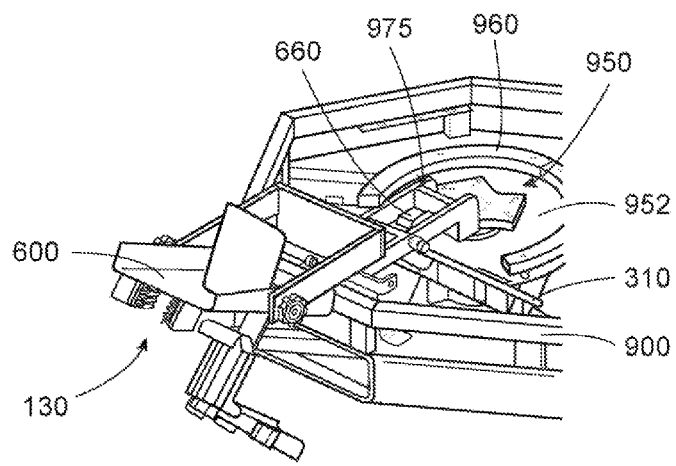
Figure 30:
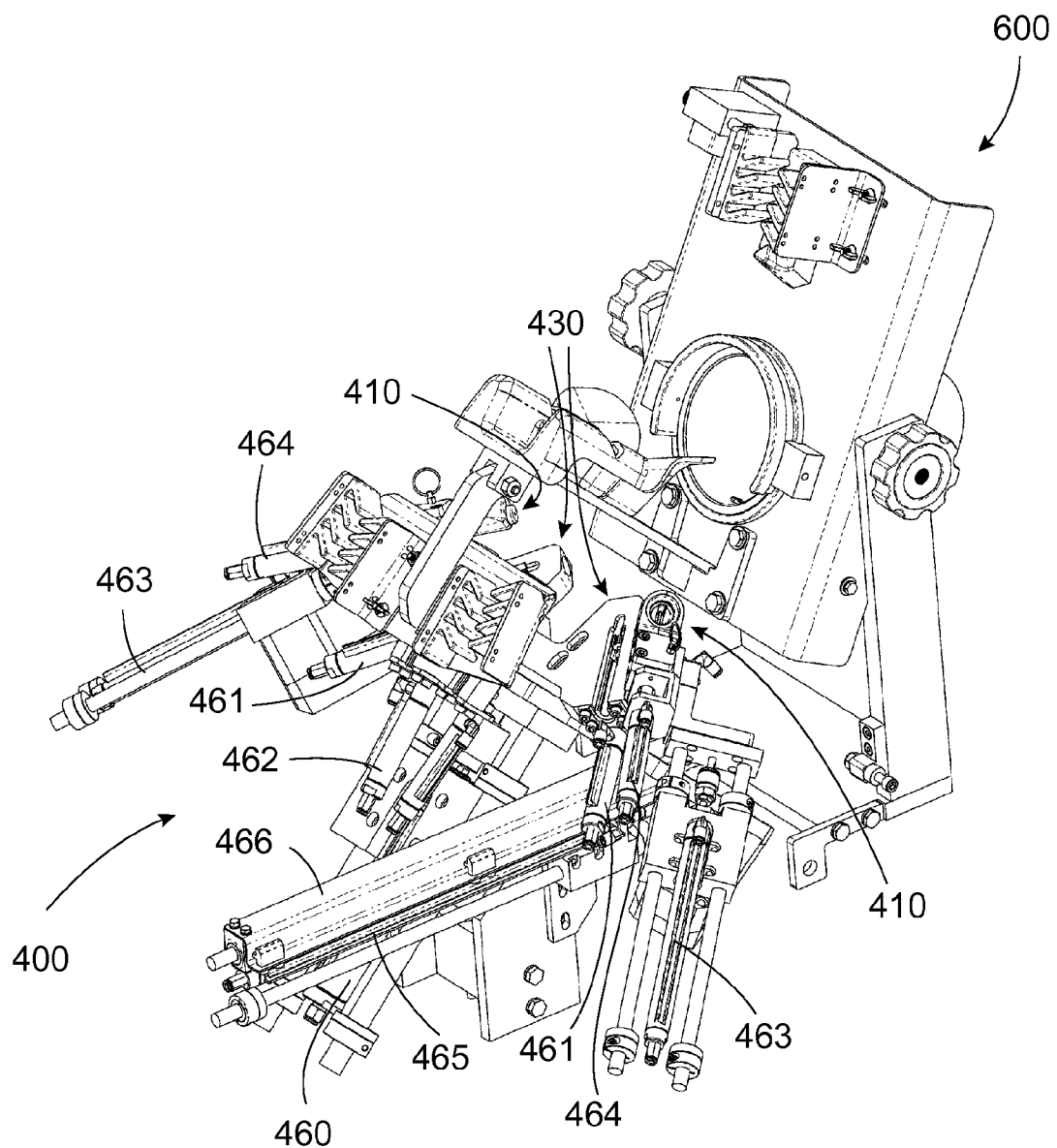
Figure 31:
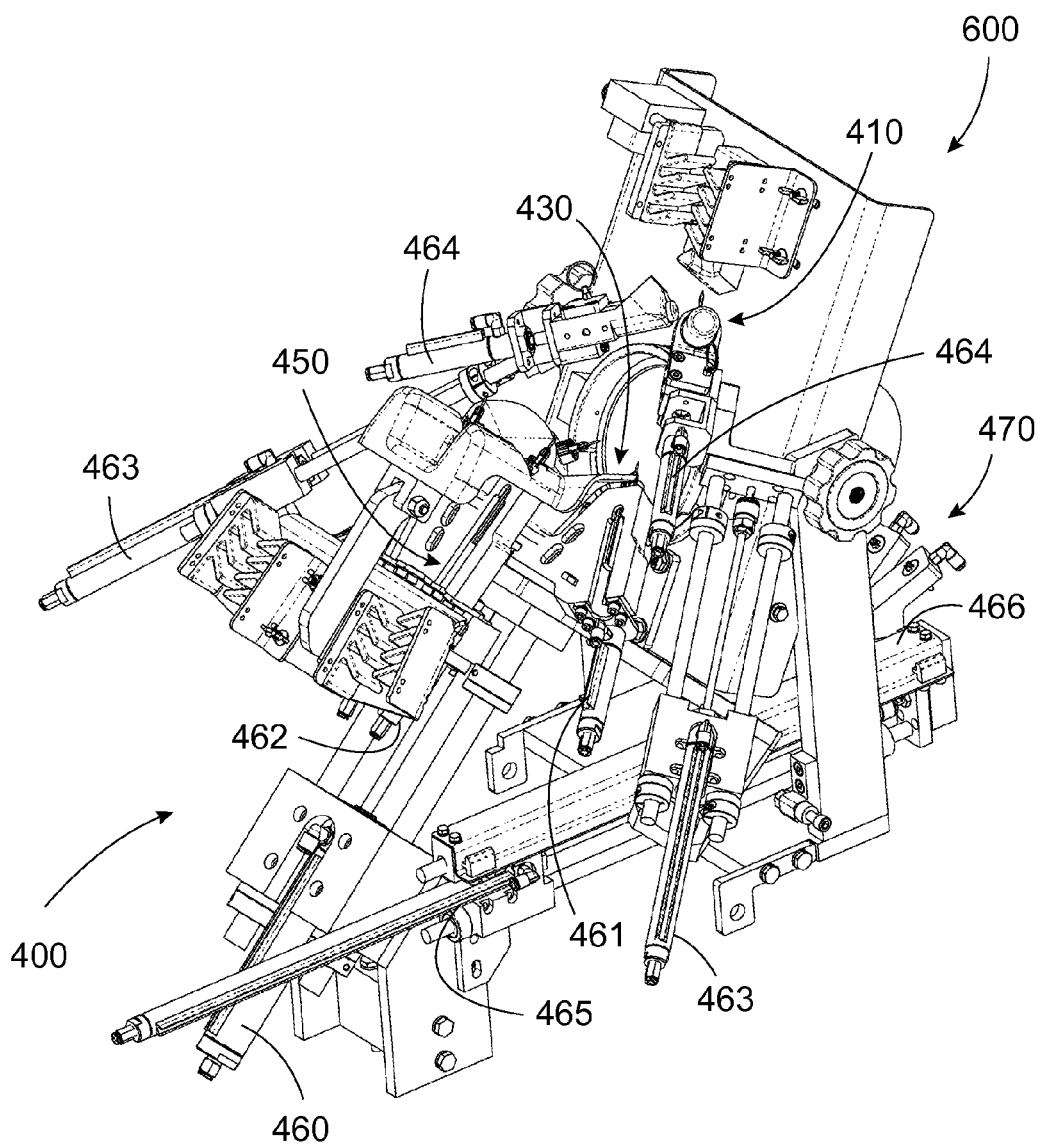
Figure 32:
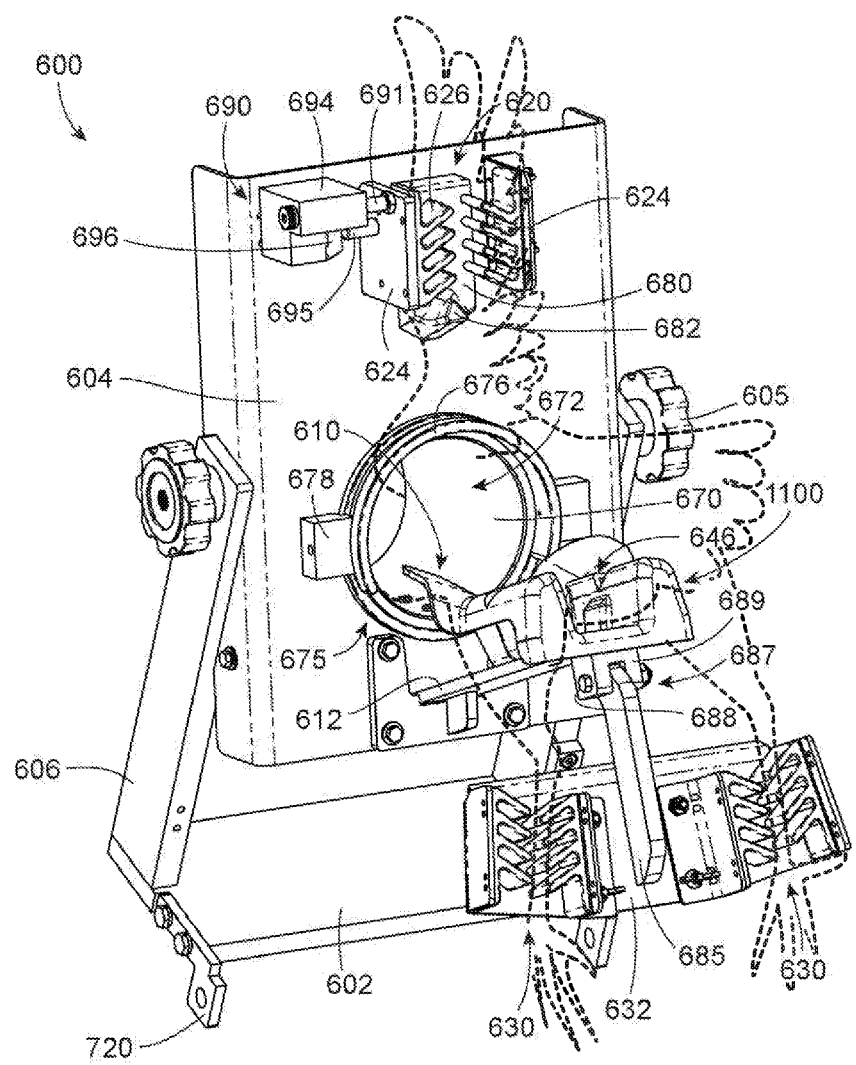
Figure 33:
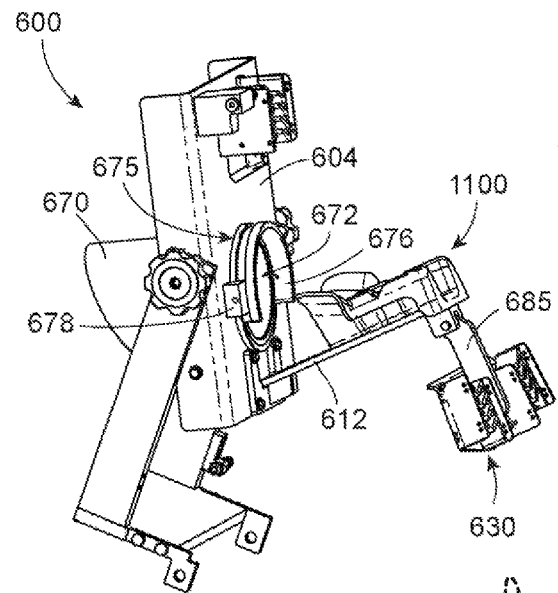
Figure 34:
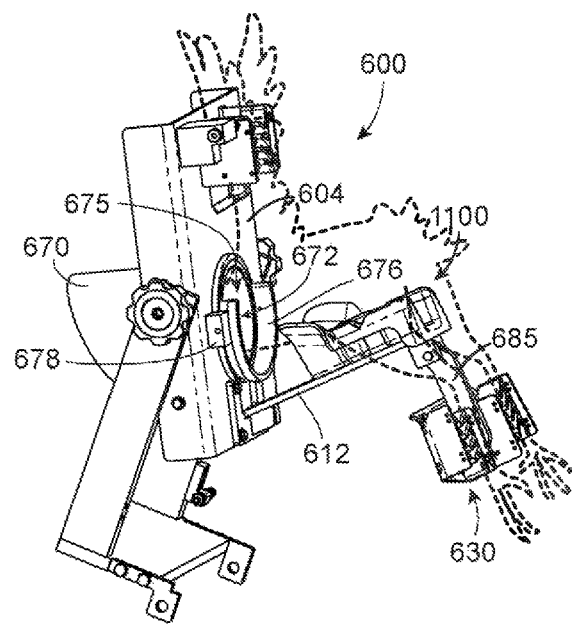
Figure 35:
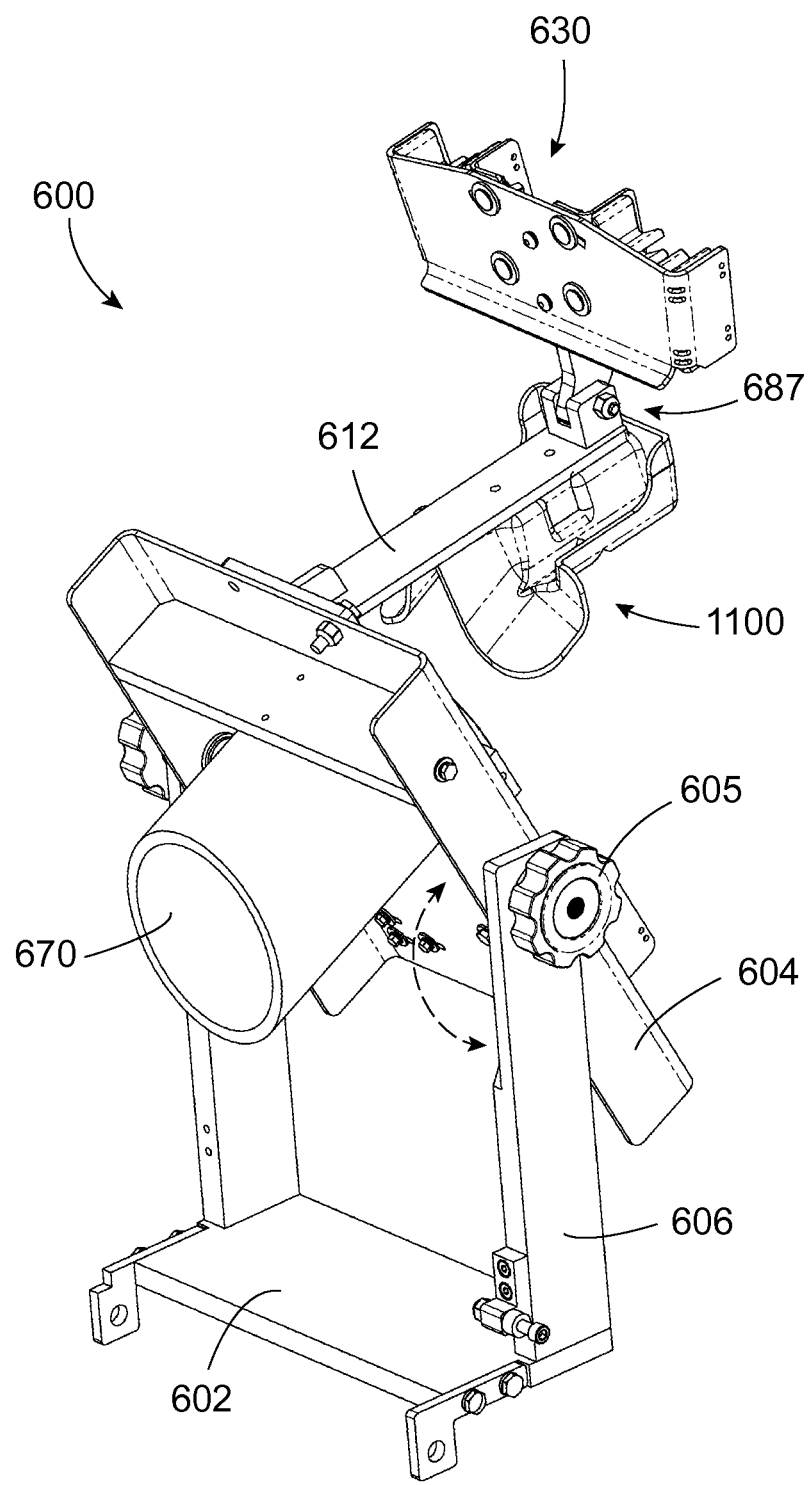
Figure 36:
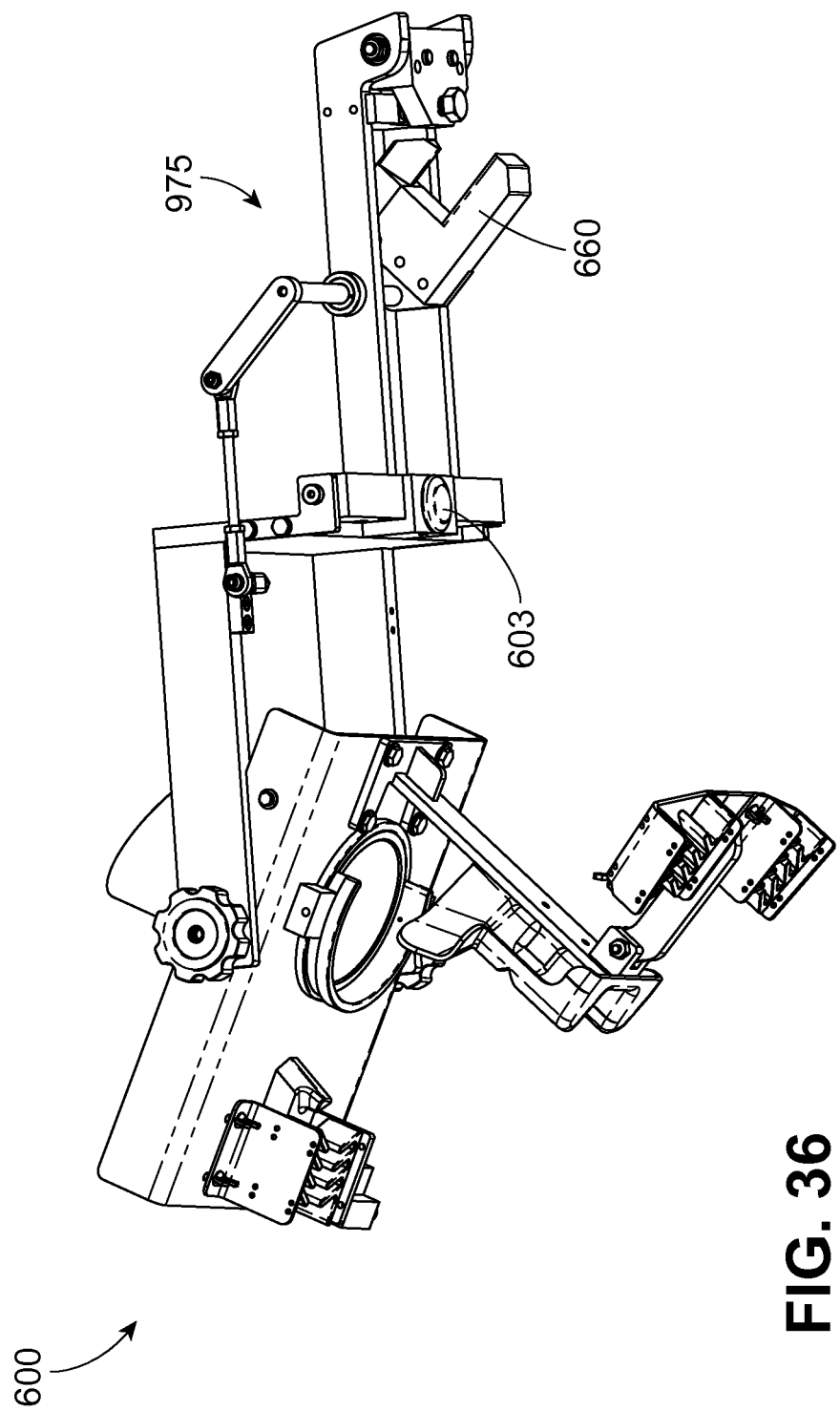
Figure 37:
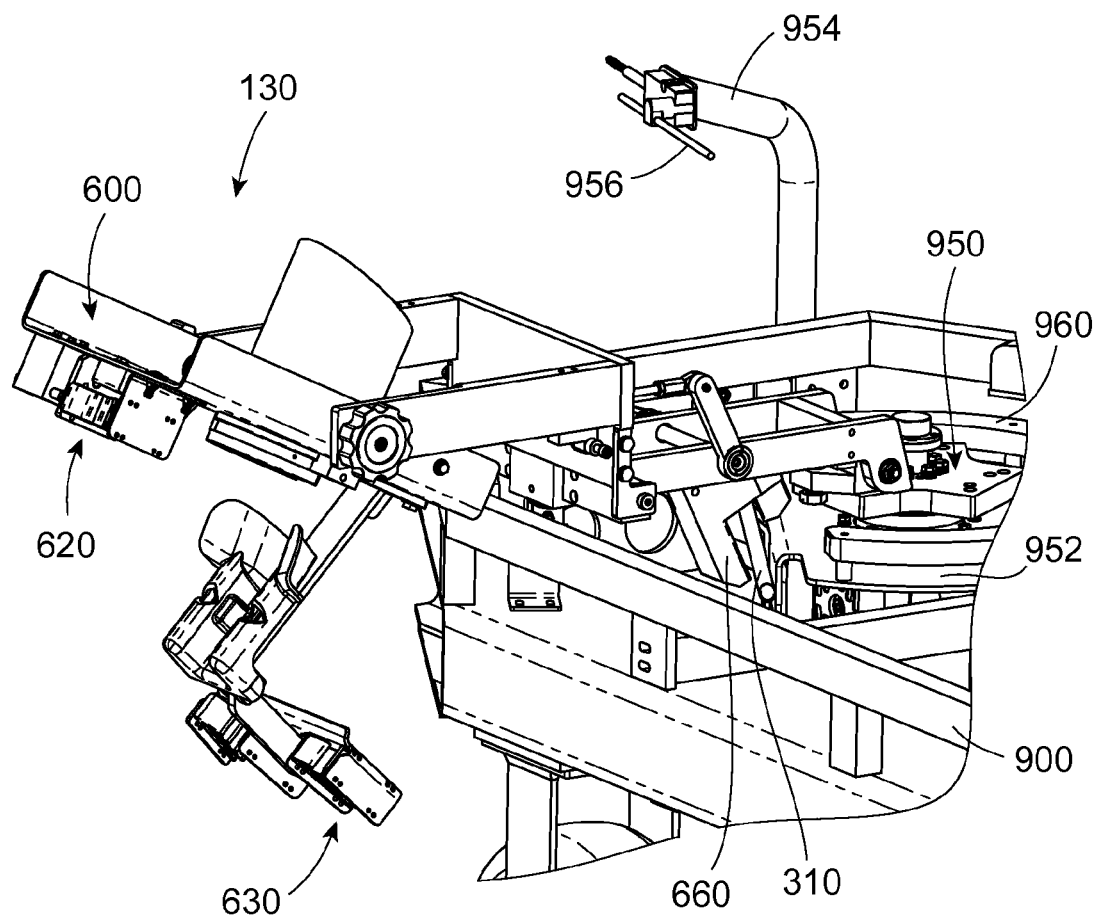
Figure 38:
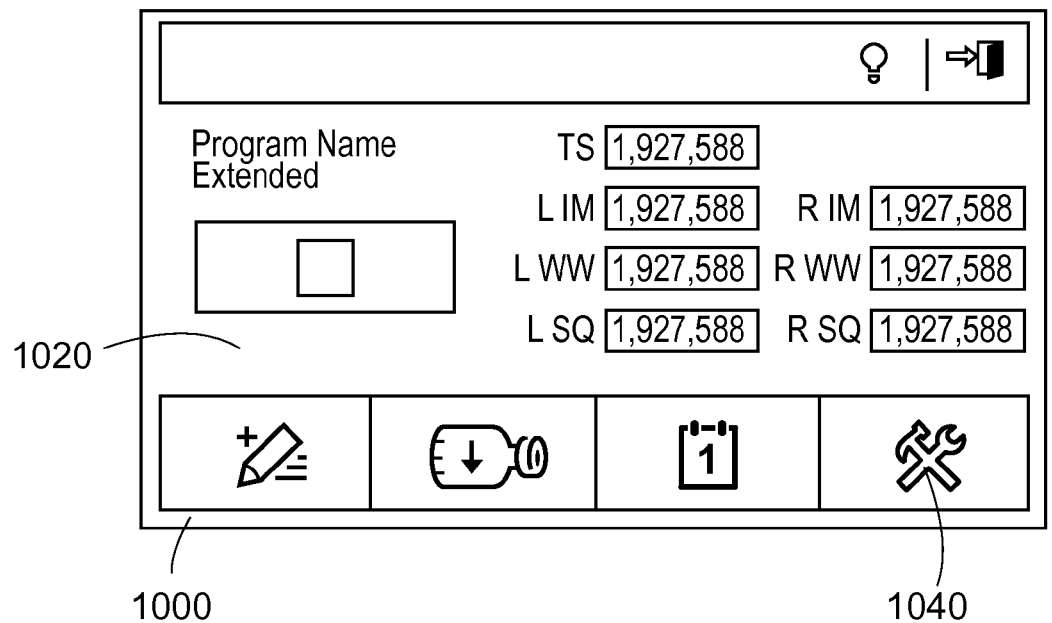
Figure 39:
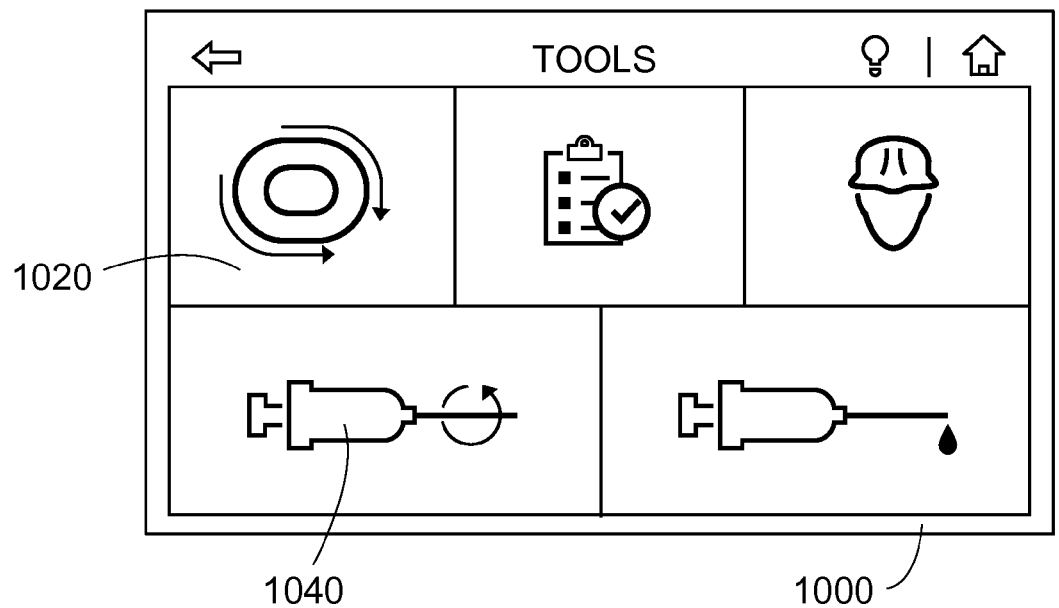

Having thus described various embodiments of the present disclosure in general terms, reference will now be made to the accompanying drawings, which are not necessarily drawn to scale, and wherein:

FIG. 1 is a schematic perspective view of a vaccination system for vaccinating avian pullets, according to one aspect of the present disclosure;

FIG. 2 is a schematic perspective view of a transport assembly of a vaccination system for vaccinating avian pullets, the transport assembly having a plurality of positioning devices engaged therewith, according to one aspect of the present disclosure;

FIG. 3 is a schematic perspective view of a vaccination system for vaccinating avian pullets, with a single positioning device shown engaged with a transport assembly;

FIG. 4 is a schematic top view of a transport assembly of a vaccination system, according to one aspect of the present disclosure;

FIG. 5 is a schematic side view of a transport assembly of a vaccination system, according to one aspect of the present disclosure;

FIG. 6 schematically illustrates a loading procedure for a vaccination system, according to one aspect of the present disclosure;

FIG. 7 is a schematic perspective view of a portion of a conveyor assembly for a transport assembly of a vaccination system, according to one aspect of the present disclosure;

FIG. 8 is a schematic perspective view of a positioning device coupled to a carriage assembly, according to one aspect of the present disclosure;

FIG. 9 is another schematic perspective view of the positioning device and carriage assembly of FIG. 8;

FIG. 10 is a schematic perspective view of a positioning device pivotably hinged to a portion of a carriage assembly, according to one aspect of the present disclosure;

FIG. 11 is a partially exploded perspective view of a carriage assembly, according to one aspect of the present disclosure;

FIG. 12 is a schematic perspective view of a release assembly for automatically releasing an avian pullet from a positioning device, according to one aspect of the present disclosure;

FIG. 13 is a schematic perspective view of the release assembly of FIG. 12, illustrating the positioning device in a rotated position for releasing the avian pullet, according to one aspect of the present disclosure;

FIG. 14 is a schematic perspective view of a vaccine delivery apparatus for a vaccination system, according to one aspect of the present disclosure;

FIG. 15 is a schematic perspective view of a shuttle assembly, according to one aspect of the present disclosure;

FIG. 16 is a schematic perspective view of a vaccine delivery assembly, according to one aspect of the present disclosure;

FIG. 17 is an exploded perspective view of the vaccine delivery assembly of FIG. 16;

FIG. 18 is schematic cross-section view of a spray delivery device, according to one aspect of the present disclosure;

FIGS. 19-21 are perspective views of a reservoir assembly for use with a vaccine delivery assembly, according to one aspect of the present disclosure;

FIG. 22 is a cross-sectional view of the reservoir assembly of FIG. 21 along the line 22-22;

FIGS. 23 and 24 are various perspective views of a vaccination system for vaccinating avian pullets, according to another aspect of the present disclosure;

FIG. 25 is a side view of a vaccination system for vaccinating avian pullets, according to one aspect of the present disclosure;

FIG. 26 is a front view of a vaccination system for vaccinating avian pullets, according to one aspect of the present disclosure;

FIG. 27 is a top view of a vaccination system for vaccinating avian pullets, according to one aspect of the present disclosure;

FIG. 28 is a sectional perspective view of a vaccination system for vaccinating avian pullets, illustrating a positioning device upon arrival at a release position, according to one aspect of the present disclosure;

FIG. 29 is a sectional perspective view of a vaccination system for vaccinating avian pullets, illustrating a positioning device rotated forward to release an avian pullet therefrom, according to one aspect of the present disclosure;

FIG. 30 is perspective view of a vaccine delivery assembly having a main actuator in a non-actuated position, according to another aspect of the present disclosure;

FIG. 31 is a perspective view of a vaccine delivery assembly having a main actuator in an actuated position, according to another of the present disclosure;

FIG. 32 is a perspective view of a positioning device for a vaccination system, according to another aspect of the present disclosure;

FIG. 33 is a perspective view of the positioning device of FIG. 32 having a size adjustment assembly in a first position, according to one aspect of the present disclosure;

FIG. 34 is a perspective view of the positioning device of FIG. 32 having a size adjustment assembly in a second position, according to one aspect of the present disclosure;

FIG. 35 is a perspective view of the positioning device of FIG. 32 rotated to a transport position, according to one aspect of the present disclosure;

FIG. 36 is a perspective view of a positioning device operably engaged with a linkage assembly, according to one aspect of the present disclosure;

FIG. 37 is a sectional perspective view of a vaccination system with a positioning device at a release position for automatically releasing an avian pullet, according to one aspect of the present disclosure; and FIGS. 38 and 39 are images of a user interface display for a vaccination system, according to one aspect of the present disclosure.

DETAILED DESCRIPTION OF THE DISCLOSURE

Various aspects of the present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

According to some aspects, the present disclosure is directed to systems, assemblies and automated methods for delivering vaccines to an avian bird, such as, for example, a pullet. The aspects disclosed herein provide automated solutions to improve efficiencies related to delivering vaccines to avian birds. For example, aspects of the present disclosure may allow for administration of multiple different vaccinations simultaneously by automated means. Further, aspects of the present disclosure may also provide improved means for presenting an avian bird for various purposes, including presenting an avian bird for a vaccination procedure. In addition, aspects of the present disclosure may provide for increased vaccination throughput of avian birds in a commercially viable manner.

As shown in FIG. 1, a vaccination system 1 may be provided for vaccinating avian birds, such as an avian pullet, in an automated queuing manner. According to some aspects, the vaccination system 1 may generally include a transport assembly 200, a vaccine delivery assembly 400 (which, in some instances, may be provided as part of a vaccine delivery apparatus 500), and a plurality of positioning devices 600. As shown in FIG. 6, one or more operators 5 may load avian pullets into the positioning devices 600 in a loading zone 10. The positioning devices 600 may be engaged with the transport assembly 200 such that each positioning device 600 may be transported proximate to the vaccine delivery assembly 400 about the transport assembly 200 in direction 15. When a respective positioning device 600 reaches the vaccine delivery assembly 400, the avian pullet may undergo one or more injection procedures, such as, for example, a vaccine delivery procedure, as administered by the vaccine delivery assembly 400. In some instances, multiple vaccines may be delivered simultaneously to the avian pullet by the vaccine delivery assembly 400. While FIG. 1 illustrates the vaccination system 1 as having eight positioning devices 600, it will be understood that the present disclosure is not limited to any particular quantity of positioning devices 600. For purposes of clarity, FIGS. 3-5 illustrate only a single positioning device 600 engaged with the transport assembly 200.

According to some aspects, the vaccine delivery assembly 400 may be moveable between a mating position 20 and a release position 25. In this regard, the vaccine delivery assembly 400 may be capable of move or oscillate between the mating position 20 and the release position 25 in order to allow continuous movement of the positioning devices 600 on the transport assembly 200. To that end, throughput of the vaccination system 1 may be improved since the positioning devices 600 do not need to be stopped proximate to the vaccine delivery assembly 400 such that the vaccine delivery procedure can be administered. Of course, aspects of the present disclosure are not limited to continuous transport of the positioning devices 600 and, in some instances, it may be desirable to stop or pause each positioning device 600 relative to the vaccine delivery assembly 400 during administration of the vaccine delivery procedure to an avian pullet.

In instances where continuous movement of the positioning devices 600 is desired, each positioning device 600 may transport an avian pullet to the mating position 20 where the positioning device 600 mates with the vaccine delivery assembly 400 and then moves therewith until the positioning device 600 reaches the release position 25, at which point the vaccine delivery assembly 400 returns to the mating position 20 to engage a subsequent positioning device 600. Between the mating position 20 and the release position 25, the avian pullet may be subjected to the vaccine delivery procedure. After undergoing the vaccine delivery procedure and clearing the release position 25, the avian pullet may be manually or automatically unloaded from the positioning device 600 such that the positioning device 600 is available for loading of another avian pullet once reaching the loading zone 10.

As shown in FIGS. 2-5, the transport assembly 200 may be portable such that the transport assembly 200 is capable of being moved around a facility by one or more operators. In this regard, the transport assembly 200 may include one or more handles 202 and wheels 204 coupled or otherwise connected to a transport assembly frame 206. In some instances, the transport assembly frame 206 may be constructed of aluminum in order to maintain the weight of the transport assembly 200 in a range that can be handled by the operators, while additionally providing corrosion resistance. A safety rail 208 may be mounted to the transport assembly frame 206 on the side of the loading zone 10 to keep the operators at a safe distance from the moving components of the transport assembly 200. The safety rail 208 may be retractable or removable to reduce the overall width of the transport assembly 200 for permitting passage thereof through doorways or other limited spaces.

According to some aspects, the transport assembly 200 may include a guide system 240 for guiding the positioning devices 600 about the transport assembly 200 such that the positioning devices 600 may move between the loading zone 10 for receiving an avian bird and then return to the loading zone 10 for loading of an additional avian bird after vaccination and unloading of the previous avian bird. In this regard, the transport assembly 200 may transport avian birds from one or more manual loading stations in the loading zone 10 to a single vaccination station in continuous manner. The guide system 240 may include a guide rail system having an inner guide rail 242 and an outer guide rail 244 supported by the transport assembly frame 206. The inner guide rail 242 and the outer guide rail 244 may be constructed of metal (e.g., stainless steel) to provide strength and corrosion resistance. The guide system 240 may be configured to engage or interact with a carriage assembly 700 (FIG. 11) coupled to the positioning device 600, wherein the guide system 240 may be capable of facilitating guidance of the positioning devices 600 about the transport assembly 200 in a stable manner.

The transport assembly 200 may include means for moving the positioning devices 600 about the guide system 240 or otherwise about the transport assembly 200. For example, as shown in FIG. 7, the transport assembly 200 may include a conveyor assembly 275 for moving the positioning devices 600 to transport the avian pullets. In some instances, the conveyor assembly 275 may be a belt conveyor assembly having a power driven belt 280, wherein the drive belt 280 may be driven by any appropriate power means, such as, for example, electric or hydraulic power. The guide rail assemblies 700 and/or the positioning devices 600 may be attached, fastened, or otherwise coupled to the conveyor assembly 275 (e.g., the drive belt 280) using coupling means (e.g., a coupling device 282) fastened to the belt 280 such that movement of the drive belt 280 causes the guide rail assemblies 700 and/or the positioning devices 600 to move about the transport assembly 200. A corresponding linkage means (e.g., linkage device 715) may be provided on the carriage assembly 700 or the positioning device 600 and configured to fixedly engage with the coupling device 282.

As such, the guide rail assemblies 700 may be connected to the drive belt 280, which may be driven by a drive assembly (e.g., a gear motor assembly) and pulley set having associated pulleys 284. In this regard, the conveyor assembly 275 may facilitate movement of the avian pullets from one or more manual loading stations to the vaccine delivery assembly 400 in continuous fashion. The linkage device 715 may include a release means to disengage the positioning device 600 from the drive belt 280 in the event of a mechanical interference.

Power for the transport assembly 200 may be provided using an umbilical connection from the vaccine delivery apparatus 500 using an appropriate electrical connector, which may be used to provide electrical power for the drive assembly, power/signal for associated electronic components, and emergency stop feature. One or more junction boxes may be installed on the transport assembly 200 for the umbilical connection to be made. In some instances, the transport assembly 200 may not function without the umbilical connection. An electronic encoder may be installed on the drive assembly for timing of motion of the vaccine delivery assembly 400 with the motion of the positioning device 600. The encoder may be used to provide alignment between the positioning device 600 and vaccine delivery assembly 400 in order to facilitate proper vaccine administration. However, any appropriate means may be used to synchronize movement between the positioning device 600/carriage assembly 700 with the vaccine delivery assembly 400. In some instances, one or more sensors may be installed on the transport assembly 200 to detect the presence of an avian pullet in the positioning device 600 at the vaccine delivery assembly 400 and to detect proper unloading of the avian pullet after undergoing the vaccine delivery procedure.

According to some aspects, the transport assembly 200 may require a physical connection to the vaccine delivery apparatus 500 for vaccinations to occur. In some instances, such a docking connection may be achieved by one or more docking devices. For example, one or more projecting members 230 may be mounted on the side of the transport assembly 200 at the location of the vaccine delivery assembly 400, while mating sockets 232 may be mounted on an end of the vaccine delivery apparatus 500. When the vaccine delivery apparatus 500 is pushed towards the projecting members 230, which are received within the mating sockets 232, the vaccine delivery apparatus 500 may be guided into alignment both vertically and horizontally by the projecting member 230. A jack assembly may be provided for leveling the vaccine delivery apparatus 500 after the projecting members 230 are engaged with the mating sockets 232. Further, the transport assembly 200 and the vaccine delivery apparatus 500 may be coupled together using clamping devices 234. A flexible skirt 525 may be provided on the vaccine delivery apparatus 500 to prevent avian pullets from hiding underneath.

As shown in FIG. 11, the carriage assembly 700 may include a mount plate 702 for mounting the positioning device 600 to the carriage assembly 700. FIG. 10 illustrates the connection between the mount plate 702 and the positioning device 600. In some instances, the positioning device 600 may be pivotably engaged with the carriage assembly 700. This pivoting feature may be used for various purposes including, for example, to aid release of the avian pullets from the positioning device 600. In this regard, the carriage assembly 700 may include a hinge 720 and associated hinge fasteners to allow the positioning device 600 to pivot or rotate with respect to the carriage assembly 700 and particularly with respect to the mount plate 702.

The carriage assembly 700 may further include various brackets forming the general structure thereof. One or more guide wheel assemblies may be provided to engage the guide system 240. For example, a first guide wheel assembly 704 (shown exploded) and a second guide wheel assembly 706 (shown assembled), each formed of two wheels 708, may be provided and fastened on opposite ends of the mount plate 702. The first and second guide wheel assemblies 704, 706 may engage the outer guide rail 244 when the carriage assembly 700 is engaged with the transport assembly 200. A third guide wheel assembly 710 may be provided on the carriage assembly 700 for engaging the inner guide rail 242 of the guide system 240. In addition, a roller guide assembly 712 may be provided such that the inner guide rail 242 is between the third guide wheel assembly 710 and the roller guide assembly 712 when the carriage assembly 700 is engaged with the guide system 240. In this regard, the carriage assembly 700 may be provided as a tri-wheeled assembly having two pivoting axles and one floating axle to provide support for the positioning device 600 while affording the ability to traverse tight radii in the guide system 240 without binding. The carriage assembly 700 may further include the linkage device 715 for facilitating attachment of the carriage assembly 700 to the conveyor assembly 275.

In some instances, a magnetic plate 730 may be provided on the carriage assembly 700 and/or the positioning device 600 to aid in coupling and aligning the positioning device 600 with the vaccine delivery assembly 400 during the vaccine delivery procedure, as discussed further herein below. In this regard, the magnetic plate 730 may serve as a target for coupling the positioning device 600 with the vaccine delivery assembly 400.

According to some aspects, the positioning device 600 may be mounted to the carriage assembly 700 such that the positioning device 600 is moved about the transport assembly 200 in connection with movement of the guide rail assemblies 700 as driven around the guide system 240 by the conveyor assembly 275. In some instances, as shown in FIGS. 8-10, the positioning device 600 may include a base plate 602 capable of being mounted to the mount plate 702 of the carriage assembly 700 and fastened thereto using appropriate, hinges, brackets and/or fasteners. As mentioned previously, in some instances the positioning device 600 may be pivotably connected to the carriage assembly 700 to aid with release of the avian pullets, but in other instances the positioning device 600 may be attached to the carriage assembly 700 in a fixed relationship.

The positioning device 600 may be specifically configured to comfortably retain the avian pullet during queuing and during the vaccination delivery procedure. Additionally, the positioning device 600 may be particularly configured to optimally present the avian pullet to the vaccine delivery assembly 400 for the vaccination delivery procedure. In general, the positioning device 600 may be configured to position the avian pullet in a posture similar to a flight form, with its wings held above the back, together and nearly vertical. The head of the avian pullet may be positioned down and forward, with the legs extended straight back nearly horizontal. Because of the configuration of the positioning device 600, the weight of the avian pullet may be supported under the breast, at the large wing feathers and at each leg. In this regard, the positioning device 600 may particularly provide comfort for the avian pullet, as well as placing the body in optimal position for each vaccination of the vaccine delivery procedure.

According to one particular aspect, as shown in FIGS. 8-10, the positioning device 600 may generally include a holder frame 604. In some instances, the positioning device 600 may include rotatable knobs 605 that may be tightened or loosened to allow the upper portion of the positioning device 600 to rotate in a folded-up manner, as shown in FIG. 35, to allow for transportation of the positioning devices 600 when attached to the transport assembly 200. The positioning device 600 may have one or more pairs of frame members 606, 608 extending from the base plate 602.

A breast support 610 for supporting the breast of the avian pullet may be connected to one or more breast support brackets 612 extending from the frame members 608. In some instances, the breast support 610 may be formed of discrete breast support members 614, 616 that cooperate to form a dip or saddle-shape for receiving the breast of the avian pullet. In other instances, however, the breast support 610 may be formed of a unitary structure. According to some aspects, the breast support members 614, 616 may define apertures 618, which allow needles or other injection devices to pass therethrough for injecting the avian pullet.

A wing mount 620 may be provided for maintaining the wings of the avian pullet in a substantially up-right, vertical position. In this regard both wings may be held above the back of the avian pullet, together and nearly vertical, to be received within the wing mount 620. The wing mount 620 may be mounted to a wing mount plate 622 extending between the frame members 608. The wing mount 620 may include a pair of wing mount brackets 624, each having a plurality of pliant members 626 extending inwardly toward the other wing mount bracket 624 so as to form opposing finger-like structures. The opposing pliant members 626 may cooperate to form a channel 628 therebetween for receiving the wings of the avian pullet, wherein the channel 628 extends substantially perpendicular to the projecting direction of the pliant members 626. In this regard, the wings may be inserted between the flexible and opposing pliant members 626 along the crease such that the pliant members 626 interact with the wings for firmly gripping and maintaining the wings within the wing mount 620. However, the pliant members 626 may be configured in such a manner that when the positioning device 600 reaches the unloading position and the positioning device 600 is rotated up slightly past vertical, gravity easily pulls the wings of the avian pullet out of the wing mount 620. In some instances, the pliant members 626 may be angled with respect to the wing mount brackets 624 such that opposing pliant members 626 extending from opposite wing mount brackets 624 form an apex-like structure. The pliant members 626 may be formed or molded of various shapes and sizes as appropriate and may be constructed from materials have resilient type properties, such as, for example, silicone.

In some instances, the wing mount 620 may position both wings in an upright position for access to the wing web of the bird on either side, while also minimally restraining the wing motion in one direction with the pliant members 626. According to some aspects, as shown in FIG. 32, at least one of the wing mount brackets 624 may be hinged with a hinge device 690 so as to assist with the automated release of the avian pullet based on gravity when the positioning device 600 rotates into a release position. The hinge device 690 may be attached or otherwise coupled to the holder frame 604. In some instances, the hinge device 690 may include a hinge pin 691 extending through a hole defined by a hinge bracket 694 and attached to one of the wing mount brackets 624. A displacement pin 695 attached to the wing mount bracket 624 may also be provided for abutting the hinge bracket 694 when the wings are positioned within the wing mount 620 so as to prevent the hinge pin 691 from moving laterally within the hole. Upon release of the bird, by rotating the positioning device 600 forward, the wing mount bracket 624 may pivot away from the holder frame 604 as facilitated by the hinge pin 691 to cause the displacement pin 695 to be transported along a chamfered portion 696 of the hinge bracket 694, thereby allowing the hinge pin 691 to move laterally within the hole such that the wing mount bracket 624 also moves laterally away from the other wing mount bracket 624. Thus, the hinge device 690 may be used to increase spacing between the wing mount brackets 624 in order to improve the release conditions for the avian pullet upon the positioning device 600 being rotated to a release position.

In some instances, as shown in FIG. 32, the wing mount 620 may include a wing separator 680 that creates a backdrop to prevent the wings from moving away during vaccination of the wing web. Such a feature may eliminate some of the compliance of the flexible wing web skin, while improving a perforation rate of the wing web. The separator 680 may include a projecting portion 682 that creates separation of the wings.

A pair of leg mounts 630 may be provided for maintaining the legs of the avian pullet in an outstretched position. The leg mounts 630 may be particularly configured to grip the leg shank of the avian pullet. The leg mounts 630 may be mounted to a leg mount plate 632 connected to a pair of frame rods 607 extending from the frame members 608. Each leg mount 630 may include a pair of leg mount brackets 634. Each leg mount bracket 634 may have a plurality of pliant members 636 extending inwardly toward the other associated leg mount bracket 634 so as to form opposing finger-like structures. The opposing pliant members 636 may cooperate to form a channel 638 therebetween for receiving a leg (e.g., leg shank) of the avian pullet, wherein the channel 638 extends substantially perpendicular to the projecting direction of the pliant members 636. In this regard, a leg may be inserted between the flexible and opposing pliant members 636 along the crease such that the pliant members 636 interact with the leg to firmly grip and maintain the leg within the leg mount 630. However, the pliant members 636 may be configured in such a manner that when the positioning device 600 reaches the unloading position and the positioning device 600 is rotated up slightly past vertical, gravity easily pulls the legs of the avian pullet out of the respective leg mount 630. In some instances, the pliant members 636 may be angled with respect to the leg mount brackets 634 such that opposing pliant members 636 extending from opposite leg mount brackets 634 form an apex-like structure. The pliant members 636 may be formed or molded of various shapes and sizes as appropriate and may be constructed from materials have resilient type properties, such as, for example, silicone. According to some aspects, as shown in FIG. 32, a connector 685 fixedly attached to the leg mount plate 632 may be hinged to a leg support bracket 689 at a hinge point 687 using a hinge pin 688 so as to assist with the automated release of the avian pullet based on gravity when the positioning device 600 rotates forward to a release position.

The positioning device 600 may include a leg support 640 for providing support to the legs of the avian pullet when the legs are positioned within the leg mounts 630. In some instances, the leg support 640 may include a pair of discrete leg support members 642 coupled to a leg support bracket 644 extending from the leg mount plate 632. The leg support members 642 may be adjustably mounted to the leg support bracket 644 such that position adjustments can be made to accommodate avian pullets of various sizes. In some instances, the leg support members 642 may define apertures 646, which allow needles or other injection devices to pass therethrough for injecting the avian pullet.

According to some aspects of the present disclosure, the leg support members 642 may be configured to stretch the skin of the avian pullet in the leg region to present an optimal target for injection. One such target may be the inguinal fold as targeted for a subcutaneous injection. In the groin area of the avian pullet there is skin between the leg and lower abdomen that facilitates the movement of the legs. The groin is referred to as the inguinal area, and when the skin is extended by lateral leg position, a subcutaneous space known as the inguinal fold is formed. In this regard, the leg support member 642 may be configured to spread the leg and abdomen of the avian pullet, thereby creating access to the inguinal fold. The leg support 640 may cooperate with the leg mounts 630 to spread the inguinal fold over the leg support members 642 for subcutaneous injection. Formation of the inguinal fold over the leg support members 642 may advantageously provide a safe angle for needle insertion at the subcutaneous depth.

In some instances, the leg support 640 may be configured such that the leg of avian pullet is not supported along its length so that the avian pullet cannot push the leg against anything for escape. The leg support members 642 may be particularly shaped to provide access to the inguinal fold for injection. In this regard, the leg support members 642 may be angularly spaced-apart such that the leg support 640 does not interfere with the leg or abdomen of the avian pullet. In some instances, extension of the leg for gripping in the leg mount 630 causes the inguinal fold to lie over the leg support member 642. The leg support members 642 may be spaced-apart from the leg support bracket 644 in such a manner that accommodates the width and depth of the lower abdomen of the avian pullet without making contact. The configuration of the leg support members 642 may allow a desirable perpendicular needle to inguinal fold interface. In some instances, the leg support members 642 may include leg skin stops 648 that allow the avian pullet to be placed in the correct position without sliding low enough to be out of position.

According to some aspects of the present disclosure, as shown in FIGS. 32-35, the breast support 610 and leg support members 642 may be integrated into a single unit 1100 that is formed to support the breast of the avian pullet and present it as a vaccine target, while also separating the legs of the avian pullet in order to provide access to the inguinal folds thereof. In some instances, the apertures 618 may not be provided on such an integrated component such that needles or other injection devices need not pass therethrough for performing the breast injection(s) of the avian pullet.

The breast support 610, wing mount 620, leg mounts 630, and leg support 640 may cooperate to present and maintain the avian pullet in a position optimal for the vaccine delivery procedure, or any other procedure, test, or evaluation related to the avian pullet. In this regard, the avian pullet may be positioned similar to that of a flight form position. The spatial relationship between the breast support 610, wing mount 620, leg mounts 630, and leg support 640 may be varied to accommodate avian pullets of various sizes, such as to accommodate the difference between a layer pullet and a broiler/breeder type pullet.

In some instances, the positioning device 600 may include a shield assembly 650 that wraps at least partially about the head of the avian pullet when maintained in the positioning device 600. The shield assembly 650 may be provided to contain overspray of a substance (e.g., vaccine) sprayed at the facial or head region of the avian pullet. In addition, the shield assembly 650 may serve as a blinder to help calm the avian pullet upon loading into the positioning device 600. In other instances, as shown in FIGS. 32-35, the positioning device 600 may include a tube 670 configured to position the head of the avian pullet for a targeted spray vaccination, while also serving to contain any overspray of such sprayed vaccine. An end of the tube 670 may be angled in some instances.

As shown in FIGS. 32-34, a size adjustment assembly 675 may be provided on the positioning device 600 for accommodating avian pullets of various sizes. The size adjustment assembly 675 may be adjustable for re-configuring an entrance 672 into the tube 670 for the neck and head of the avian pullet. As shown in FIGS. 33 and 34, an arcuate member 676 of the size adjustment assembly 675 may be rotated about the entrance 672 to allow for various sizes of avian pullets to be appropriately positioned within the positioning device 600. The arcuate member 676 may be a partial annular member, wherein a section is missing therefrom. The positioning device 600 shown in FIG. 33 may be used for smaller avian pullets since the position of the arcuate member 676 allows the shoulders of the avian pullet to reach the holder frame 604 at the lower portion of the entrance 672. The positioning device 600 shown in FIG. 34 may be used for larger avian pullets since the position of the arcuate member 676 prevents the shoulders of the avian pullet from reaching the holder frame 604 at the lower portion of the entrance 672. The size adjustment assembly 675 may include one or more locking devices 678 or assemblies, such as, for example, including a locking pin, to lock the arcuate member 676 in the desired position.

According to some aspects of the present disclosure, as shown in FIGS. 12 and 13, the vaccination system 1 may include release means, such as a release assembly 300, for automatically releasing the avian pullets from the positioning devices 600 and the vaccination system 1 after the avian pullets have been administered the vaccine delivery procedure. In some instances, the release assembly 300 may be formed of a cam arrangement 310 connected to the transport assembly 200. In such instances, each positioning device 600 may include a displacement device 660 configured to interact with the cam arrangement 310 for pivoting the positioning device 600 to facilitate release of the avian pullet therefrom. In the regard, the displacement device 660 may interact with the cam arrangement 310 to displace and rotate the positioning device 600 away from the mount plate 702 of the carriage assembly 700.

According to one particular aspect, the displacement device 660 may configured as a pronged member connected to the base plate 602, while the cam arrangement 310 is a wire-form cam mounted on the transport assembly 200 at an unloading position downstream from the mating and release positions 20, 25. The circuitous path of the wire-form cam according to one particular aspect is illustrated in FIGS. 4, 5, 12 and 13. In such instances, the pronged member may be pushed upward and outward by the cam shape, thus rotating the positioning device 600 at the hinge 720 that attaches the positioning device 600 to the carriage assembly 700. At the maximum rotation of the positioning device 600, as shown in FIG. 13, the positioning device 600 may be slightly past vertical so as to allow gravity to pull the avian pullet out of the positioning device 600 without assistance from an operator. In some instances, a ramp 350 may be provided to reduce the distance the avian pullet may fall upon release from the positioning device 600. A cover plate (not shown) may be provided on the transport assembly 200 to prevent the positioning device 600 from rotating except for at the unloading position. This may be particularly helpful during loading of an avian pullet into the positioning device 600 such that the operator does not have to contend with a pivoting positioning device 600.

According to some aspects of the present disclosure, as shown in FIG. 14, the vaccine delivery apparatus 500 may provide the control, power supply and vaccine delivery mechanism of the vaccination system 1. The vaccine delivery apparatus 500 may include a portable cart-like structure having a frame 502 with wheels 504 and a handle 506 provided at a steerable axle end of the vaccine delivery apparatus 500 such that the vaccine delivery apparatus 500 can be moved around by one or more operators.

Electrical power for both the vaccine delivery apparatus 500 and the transport assembly 200 may be fed from a main power source by means of a flexible power cord and appropriate plug end. Power may be conditioned and distributed in an electrical enclosure mounted on the frame 502. A controller device for controlling the vaccination system 1 may be mounted in the electrical enclosure. In some instances, separate enclosures may be included to house pneumatic controls and the power supply and variable frequency drive that run the conveyor assembly 275. In some instances, compressed air may be used to operate the various vaccine delivery mechanisms and may be supplied by a self-contained air compressor 510 mounted on the vaccine delivery apparatus 500. A display device 520 may be mounted in an enclosure on the top of the vaccine delivery apparatus 500. The display device 520 may display, for example, current operating parameters, and may also provide the means by which an operator chooses the appropriate vaccine delivery procedure, speed of the conveyor assembly 275, etc. to control the entire vaccination system 1. In some instances, the enclosure may house buttons for power, start, stop and emergency-stop features. In some instances, a color coded system status indicator light 530 may be mounted to the vaccine delivery apparatus 500. According to some aspects, the controller device may be capable of record-keeping, counting, data gathering and analysis, etc. to prevent avian pullets from receiving duplicate vaccinations.

A treatment substance, such as, for example, vaccine, may be fed to various vaccination devices of the vaccine delivery assembly 400 by means of one or more fluid delivery systems 150, depending on the number of vaccination devices. The fluid delivery system 150 may include any suitable means or mechanisms, or combinations thereof, for supplying fluid to a vaccination device. Such fluid delivery systems 150 may include, for example, peristaltic pumps, diaphragm pumps or any other types of fluid pumps. In any instance, the fluid delivery systems 150 may be mounted on the vaccine delivery apparatus 500 and preferably mounted as close as is practical to the vaccine delivery assembly 400 to minimize potential vaccine waste in the delivery tubing. Vaccine supply reservoirs for each fluid delivery system may be positioned above associated pump inlets in order to provide positive head to the fluid delivery systems.

According to some embodiments, the vaccine delivery apparatus 500 may include the vaccine delivery assembly 400. In this regard, the vaccine delivery assembly 400 may be mounted on the vaccine delivery apparatus 500 such that it may be easily transported proximate to the transport assembly 200 for appropriate engagement therewith. In some instances, the vaccine delivery assembly 400 may be stationary during operation of the vaccination system 1, wherein each positioning device 600 may be delivered proximate to the vaccine delivery assembly 400 and then stopped such that the avian pullet carried thereby may undergo the vaccine delivery procedure as administered by the vaccine delivery assembly 400.

In other instances, however, as previously described the vaccine delivery assembly 400 may be moveable with the positioning devices 600 such that the positioning devices 600 can move in a continuous manner about the transport assembly 200 without stopping. In this regard, the vaccine delivery apparatus 500 may include a shuttle assembly 800 mounted to the frame 502. The shuttle assembly 800 may be configured to move the vaccine delivery assembly 400 back and forth between the mating position 20 and the release position 25 in a somewhat oscillating manner. As such, the vaccine delivery assembly 400 may be synchronized to move with a respective positioning device 600 once it reaches the mating position.

To ensure proper mating and alignment between the positioning devices 600 and the vaccine deliver assembly 400, the vaccination system 1 may include one or more alignment assemblies. For example, an actuatable member 490 such as, for example, a pin assembly may be actuated to extend outward to engage a mating member of the positioning device 600 or the carriage assembly 700 for physically coupling and mating the positioning device 600/carriage assembly 700 with the vaccine delivery assembly 400. As another example, the vaccine delivery assembly 400 may include an electromagnetic coupling device 495 capable of being actuated to interact with the magnetic plate 730 of the carriage assembly 700 for coupling and mating the carriage assembly 700 with the vaccine delivery assembly 400 in a non-contact manner.

As shown in FIG. 15, the shuttle assembly 800 may include a shuttle platform 802 to which the vaccine delivery assembly 400 may be mounted. The shuttle platform 802 may be driven linearly by an appropriate drive assembly, which in some instances may include, for example, a linear motor or a rotary servo driving a linear table, or other suitable drive means to move in unison with the positioning device 600. In this regard, the controller device may be configured to receive an encoder signal from the drive assembly of the conveyor assembly 275 and convert the encoder signal into a drive signal to the drive means of the shuttle assembly 800 to move the vaccine delivery assembly 400 along with the positioning device 600. The shuttle platform 802 may be configured to move back and forth along one or more shafts 808 and between end plates 804 mounted to a base plate 806.

According to various aspects of the present disclosure, the vaccine delivery assembly 400 may be capable of providing one or more treatment substances (e.g., vaccines, nutritional supplements, etc.) to the avian pullet according to a vaccine delivery procedure while the avian pullet is maintained in the positioning device 600. In this regard, the vaccine delivery assembly 400 may include one or more vaccination devices capable of injecting, spraying, or otherwise delivering treatment substances to the avian pullet. In some instances, the controller device of the vaccine delivery apparatus 500 may be capable of enabling and disabling certain vaccination devices of the vaccine delivery assembly 400 so as to allow for customized vaccine delivery procedures. That is, any one, combination, or all of the vaccination devices may be selected for operation. The treatment substances may be individually supplied to each vaccination device such that multiple treatment substance may be used. In some instances, the injections or delivery of the treatment substances may occur simultaneously, while in other instances the injections or delivery of the treatment substances may occur sequentially.

According to one particular aspect, as shown in FIGS. 16 and 17, the vaccine delivery assembly 400 may be particularly configured to administer seven vaccinations to an avian pullet, including two separate intra-muscular breast injections, two separate wing web injections or piercings through the loose skin between each wing and the sides of the body, two subcutaneous injections in the inguinal folds of skin, and one spray application into the facial region of the avian pullet to be ingested, inhaled, and absorbed through the mucous membranes surrounding the eyes. It will be understood that the present disclosure is not limited to the particular configuration illustrated and is only provided as one exemplary embodiment. Because the vaccination devices are on a different device (i.e., the vaccine delivery assembly 400) than the positioning devices 600, automated means and mechanisms may be needed to reach into the positioning device 600 to deliver the treatment substance.

According to one particular aspect, the vaccine delivery assembly 400 may include a pair of wing web injection devices 410 connected to a vaccine delivery frame 402 and capable of delivering a treatment substance to the wing webs of an avian pullet. Each wing web injection device 410 may be pneumatically operated to result in the piercing of a wing web with a needle 424 wetted with a treatment substance. In some instances, the wing injection device 410 may include a three part actuation assembly to carry out the wing web injection procedure. FIG. 16 illustrates the wing web injection device 410 in a fully actuated position, ready for injecting. A wing web carriage assembly 412 may be raised to an appropriate height by a first actuator device 414 (e.g., a pneumatic cylinder). A vaccinator arm 416 of the wing web carriage assembly 412 may be rotated or articulated into a position proximate to the location of the wing web via a second actuator device 418 (e.g., a pneumatic cylinder) so as to position a needle holder assembly 420 proximate to the wing web. FIG. 17 illustrates the vaccinator arm 416 in a non-actuated position. A wetted wing web needle 424 may then be extended by a third actuator device 426 (e.g., a pneumatic cylinder) to pierce the wing web skin of the avian pullet so as to drag the treatment substance into the tissue of the avian pullet.

As shown in FIGS. 19-22, a reservoir assembly 425 may hold a vaccine vial 422 (FIG. 16) of a treatment substance at the needle holder assembly 420 so as to facilitate a quick change out process for spent vials. The reservoir assembly 425 may provide guidance of the needle 424, load the vaccine substance onto the needle 424, and receive and hold the vaccine vial 422 to avoid having to pour vaccine substance from its original container (i.e., the vaccine vial 422). To that end the reservoir assembly 425 may include a reservoir portion 427 defining a reservoir 423 and also defining a pair of holes 428 at each end thereof for guiding the needle 424 therethrough to become wetted by passing through the vaccine fluid contained within the reservoir 423. In this regard, loading of vaccine substance into a pocket or groove (not shown) on the side of the needle 424 may be met by the needle 424 passing through the reservoir 423 filled with vaccine substance from the vaccine vial 422 naturally by gravity flow (i.e., the vial is upside down such that the vaccine substance flows therefrom naturally into the reservoir 423). The reservoir portion 427 may also serve as a sealing means around the needle 424 to prevent dripping of vaccine fluid from around the needle 424, as shown in FIG. 16. The reservoir assembly may further include a coupling portion 429 for facilitating attachment of the vaccine vial 422 to the reservoir assembly 425. Thus, receipt and retention of the vaccine vial 422 may be accomplished by the coupling portion 429, which may be in some instance molded to fit directly over a neck of a standard vaccine vial 422 containing vaccine substance used for wing web injections. The vaccine vial 422 may be uncapped and then span fit onto the coupling portion 429.

The vaccine delivery assembly 400 may include a pair of intramuscular injection devices 430 connected to the vaccine delivery frame 402 and capable of delivering a treatment substance to the breast of an avian pullet. In some instances, the intramuscular injection devices 430 may be stationary with respect to positioning of the avian pullet such that the intramuscular injection devices 430 do not need to be moved into a different position when the positioning device 600 is mated with the vaccine delivery assembly 400. Each intramuscular injection device 430 may include an intramuscular injector assembly 432 having an injector needle that may be driven into the breast muscle of the avian pullet by, for example, actuation of an actuator 431 (e.g., pneumatic cylinder) extending beneath the breast support 610. The injector needle may pass within the aperture 618 defined by the respective breast support member 614, 616 to inject the breast muscle.

The vaccine delivery assembly 400 may include a pair of subcutaneous injection devices 450 connected to the vaccine delivery frame 402 and capable of delivering a treatment substance to the inguinal folds of an avian pullet. In some instances, the subcutaneous injection devices 450 may be stationary with respect to positioning of the avian pullet such that the subcutaneous injection devices 450 do not need to be moved into a different position when the positioning device 600 is mated with the vaccine delivery assembly 400. Each subcutaneous injection device 450 may include a subcutaneous injector assembly 452 having an injector needle that may be inserted into the inguinal fold skin of the avian pullet by, for example, actuation of an actuator 451 (e.g., pneumatic cylinder). The injector needle may pass within the aperture 618 defined by the respective breast support member 614, 616 to inject the breast muscle.

The intramuscular injection devices 430 and subcutaneous injection devices 450 may be configured to allow for easy insertion and removal of tubing with luer lock fittings and luer lock needles.

The vaccine delivery assembly 400 may include a spray delivery device 470 connected to the vaccine delivery frame 402 and capable of delivering a treatment substance to a facial region of an avian pullet. In some instances, the spray delivery device 470 may be pneumatically operated using, for example, a pneumatic actuator (e.g., a pneumatic cylinder). In this regard, the spray delivery assembly 470 may include a spray assembly 472 mounted to a cylinder 474 pneumatically operated to extend the spray assembly 472 proximate to the head or facial region of the avian pullet when the positioning device 600 mates with the vaccine delivery assembly 400. The spray delivery device 470 may include one or more support rods 478 for providing support to the spray assembly 472.

The spray assembly 472 may have one or more nozzle orifices 476 configured to deliver a treatment substance to the facial region of the avian pullet as a spray. As shown in FIG. 18, within each nozzle orifice 476 may be positioned a nozzle insert assembly 480. One or more resilient annular members 475 (e.g., O-rings) may be provided about the nozzle insert assembly 480 for retaining the nozzle insert assembly 480 within the nozzle orifice 476, while also providing an air sealing means. In some instances, the nozzle insert assembly 480 may be formed of a nozzle body 481 and a nozzle member 482. The nozzle body 481 may define a cavity 483 for receiving at least a portion of the nozzle member 482. The cavity 483 may be in fluid communication with an air passage 484 defined by a manifold block 473 of the spray assembly 472. The nozzle body 481 may include a dispersion nozzle 485 configured to assist with controlling dispersion of the vaccine fluid dispensed from the spray delivery device 470. The nozzle body 481 may define a channel 486 extending around the exterior thereof, while further defining one or more holes 487 within the channel 486 such that alignment of the air passage 484 with the holes 487 is unnecessary when fluidly communicating air to the cavity 483. The nozzle member 482 may include a nozzle tip 488 for dispensing the vaccine fluid delivered through a fluid passage 491 of the nozzle member 482 when the nozzle insert assembly 480 is connected to a vaccine fluid supply source at a connector end 489.

In operation, a vaccine fluid may be provided under pressure to the nozzle tip 488 where the fluid interacts with compressed air provided at the dispersion nozzle 485 to deliver the vaccine fluid in a spray form at a desired pressure and with a desired droplet size. In this regard, the nozzle insert assembly 480 may be particularly configured to spray droplets of a desired size distribution and with an appropriately sized spray pattern at relatively low pressures. For example, the spray assembly 472 may deliver a 100 μL shot of vaccine in droplet form with a particle size of greater than or about 100 μm. Disposability and low cost may be accomplished by only having the nozzle insert assembly 480 being wetted by vaccine. The nozzle insert assembly 480 may be discarded after a predetermined number of vaccinations, at the end of shifts, etc. In this instance, the manifold block 473 and other supporting components may not be exposed to the vaccines and thus may be re-used. Connected to the nozzle insert assembly 480 may be a fluid pump system capable of precise delivery of small vaccine doses. In some instances, the introduction of the air stream may be transverse to the fluid path at the point of mixing the vaccine and the air stream such as at the nozzle tip 488 and the dispersion nozzle 485.

According to some aspects, the vaccine delivery assembly 400 may be mounted on the shuttle assembly 800. In this regard, a base plate 404 of the vaccine delivery assembly 400 may be attached to the shuttle platform 800. The vaccine delivery assembly 400 may include a pair of side plates 406 attached to the base plate 404. The vaccine delivery assembly 400 may include various other brackets, plates, spacers, or structures for providing appropriate mounting means to the various vaccination devices, with particular attention to appropriate spacing and orientations thereof.

According to another aspect of the present disclosure, as shown in FIGS. 23-29, the vaccination system 1 may be a turn table based apparatus with onboard vaccine delivery assembly 400 and positioning devices 600 such that a unified assembly may be used. In some instances, the positioning devices 600 may be evenly spaced apart on the transport assembly 200. In some instances, the transport assembly 200 may include a rotatable mounting arrangement 950 mounted to a cart frame 900, wherein the positioning devices 600 may be attached to the rotatable mounting arrangement 950 via a linkage assembly 975. One or more electrical/pneumatic enclosures 940 may be provided as part of the vaccination system 1. The positioning devices 600, regardless of the number thereof, may rotate to a loading position 110, a vaccination position 120, and a release position 130. Upon successful loading, the avian pullet may be rotated to the vaccination position 120 such that the avian pullet may be vaccinated according to a predetermined protocol. When the next avian pullet is loaded, the previous avian pullet may be rotated to the release position 130 and gently released back to the floor without human intervention. The rotatable mounting arrangement 950 may be driven by a motor assembly and associated components that facilitate such rotation. For example, the rotatable mounting arrangement 950 may be driven by a servo worm gear reducer and electrical motor (DC) mounted beneath the rotatable mounting arrangement 950. A cover plate 952 may be provided to protect the gear reducer and motor assembly from dirt or vaccine spills. The vaccination system 1 may include a switch 956 extending from a switch arm 954 that allows the operator to initiate rotation of the positioning devices 600 to the next position.

As described previously, the vaccination system 1 may include the release assembly 300 to facilitate automatic release of the avian pullets from the positioning devices 600 after the avian pullets have been administered the vaccine delivery procedure. Each positioning device 600 may include the displacement device 660 configured to interact with the cam arrangement 310 for pivoting the positioning device 600 to facilitate release of the avian pullet therefrom. In the regard, the displacement device 660 may interact with the cam arrangement 310, in which some instances may be a rod extending within or between the cart frame 900, to displace and rotate the positioning device 600 at the release position 130 away from the mounting arrangement 950, as shown in FIGS. 23, 24, 26, 27, 29 and 37. In this regard, the release assembly 300 allows the positioning device 600 in the release position 130 to rotate forward for automated release of the avian pullet. FIG. 28 illustrates the positioning device 600 rotating into the release position 130, during initial engagement with the cam arrangement 310. FIGS. 28, 29 and 37 only show a single positioning device 600 for purposes of clarity.

The release mechanism may be assisted by the hinged wing mount 620 and hinged leg mount 630 that open via gravity when the positioning device 600 is rotated forward so as to allow the avian pullet to be gently released onto its feet from close to ground height. In some instances, the positioning device 600 may remain rotated forward until the switch 956 is activated by the operator, whereby the positioning device 600 returns to its standard upright position according to the cam arrangement 310 as the positioning device 600 rotates to the loading position 110.

A retention device 960 may be provided to prevent the positioning devices 600, when positioned at the loading position 110 or vaccination position 120, from flipping or rotating forward by restricting motion of the displacement device 660. The retention device 960 may be absent at the release position 130 in order to allow the displacement device 660 to engage the cam arrangement 310 for rotating forward the positioning device 600 for automatic release of the avian pullet.

The vaccination system 1 may include a home sensor 965 and a release sensor 970. Upon initial start of a vaccination protocol, the vaccination system 1 may perform an automated homing function by rotating the mounting arrangement one step. The home sensor 965 at the vaccination position 120 may look for a home flag on the positioning device 600 and reset to a home position (e.g., the loading position 110). The release sensor 970 may be used to ensure that the positioning device 600 at the release position 130 is rotated forward from the upright position into the correct release position at initial startup of the vaccination system 1 in order to prevent any possible damage to the vaccination system 1 due to incomplete setup. The release sensor 970 may prevent the homing routine from executing if the positioning device 600 is not detected in the correct position.

According to some aspects, weight measurements of the avian pullets may also be carried out via the vaccination system 1. In some instances, weight measurements may be taken when an avian pullet is at the vaccination position 120, and in some instances prior to the vaccination cycle or protocol. In some instances, two weight measurements may be taken and the average weight of the two measurements forwarded to a controller for data logging. A weight indication may be displayed on a weight indicator display 980 wherein various colors may be used to indicate predetermined weight thresholds being achieved or not (e.g., green=average, red=above threshold, amber=below threshold), based on user entered thresholds. The controller may log the measured weight data together with a date and time stamp. The raw data may be exported. The operator may have the option to clear the log file at the beginning of the day when entering user thresholds for the upper and lower weight limits.

As shown in FIG. 28, a weighing device 985 may be provided on the vaccination system 1 to allow for taking weight measurements of the avian pullets. For example, a load cell device 986 or strain gauge device may be incorporated into the vaccination system 1 at the vaccination position 120. The positioning device 600 may stop directly on top of the load cell device 986, wherein the weight of the avian pullet causes the positioning device to deflect downward such that the weight may be measured by the load cell device 986 via the physical interaction between the load cell device 986 and the positioning device 600 (or the linkage assembly 975). In some instances, each positioning device 600 may have a projection 603 (FIG. 36) for physically engaging or interacting with the load cell device 986. An arm support(s) 987 may guide the positioning device 600 to the correct position without exercising lateral forces on the load cell device 986. The load cell device 986 may support various weights up to a predetermined maximum weight, while being mechanically protected against overloading. The load cell device 986 may be in communication with an energy amplifier and/or conditioner present at the controller and may, in some instances, collect two consecutive weight measurements within 300 milliseconds.

The controller may average the two weights and forward such information for data logging. The controller may actuate the appropriate weight indicator display 980 until the next positioning device 600 reaches the vaccination position 120, indicating that the weight of the avian pullet is above (red), within (green) or below (amber) user entered thresholds. A water tight USB port 990 may be provided on an HMI enclosure 995 for data export of the raw weight measurements. The weight measurement feature may be used to determine the absence or presence of an avian pullet in the positioning device 600 at the vaccination position 120. In this regard, the vaccination system 1 may be configured such that no vaccination occurs if an avian pullet is not present, thereby preventing vaccine spillage and waste.

According to some aspects, the vaccine delivery assembly 400 may include a main actuator 460 capable of moving an intramuscular injection actuator 461, a subcutaneous injector actuator 462, and a wing web injection actuator 463 to a position that allows for injection of the respective body part of the avian pullet, as shown in FIG. 31. As shown in FIG. 30, the main actuator 460 may retract when the vaccination protocol has been completed, and all needles and actuators have returned to their individual retract positions. Once the main actuator 460 is actuated, the needles for the intramuscular and subcutaneous injections may extend, the appropriate pump systems activated, and the vaccination protocol initiated. The main actuator 460 may be equipped with extend and retract sensors for monitoring and controlling the vaccination protocol. In some instances, the intramuscular injection actuator 461 and subcutaneous injector actuator 462 may be equipped with extend sensors for monitoring and controlling the vaccination protocol.

Upon actuation of the main actuator 460, the wing web injection actuators 463 may extend toward the wings of the avian pullet held within the positioning device 600. When positioned, the needles of the wing web injection devices 410 may extend upon actuation of wing web needle actuators 464 so as to pierce the skin of the avian pullet for delivering the vaccine. In some instances, the wing web injection actuators 463 may be equipped with extend and retract sensors for monitoring and controlling the vaccination protocol. In some instances, the wing web needle actuators 464 may be equipped with extend sensors for monitoring and controlling the vaccination protocol.

As previously described, the vaccine delivery assembly 400 may include the spray delivery device 470 for delivering a treatment substance to a facial region of an avian pullet disposed within the tube 670. In some instances, the spray delivery device 470 may include a spray device actuator 465 that may be actuated approximately with or concurrently with the main actuator 460. As shown in FIG. 31, the spray delivery device 470 may be carried by a guide 466 so as to extend beneath the tube 670 such that the vaccine may be sprayed or delivered upwardly to the face of the avian pullet. In some instances, the spray device actuator 465 may be equipped with extend and retract sensors for monitoring and controlling the vaccination protocol.

In some instances, the holding pen in which the vaccination system 1 is placed may be separated through netting 100 into a non-vaccinated side and a vaccinated side, as shown in FIG. 27. All avian pullets may be initially herded to the non-vaccinated side, wherein the vaccination system 1 may be placed between the two sides with the loading position 110 on the non-vaccinated side and the release position 130 on the vaccinated side.

In use, a helper (kneeling or sitting) may grab an avian pullet from the floor on the non-vaccinated side and transfer it to the loader (standing at the loading position 110) while holding both wings in one hand and both legs in the other. The loader may then place the avian pullet in the positioning device 600 by directing the head thereof into the tube 670 and resting its shoulders against the tube 670, resting the breast on the breast support 610, folding the wings up and placing them into the pliant members 626 of the wing mount 620 with one hand, then using both hands to separate the legs and placing the feet into the pliant members 636 of the leg mounts 630. If the bird is loaded satisfactorily, the loader may actuate the switch 956 in direct continuation of a loading motion to initiate the automated rotation of the avian pullet to the vaccination position 120 and subsequently to the release position 130. This process may be repeated until refill of the vaccines is needed or all avian pullets are vaccinated.

According to some aspects, the vaccination system 1 may keep track of vaccine counts and may alert (e.g., audible or visual alarms) the operator when vaccine levels are reaching predetermined levels.

As shown in FIGS. 38 and 39, the vaccination system 1 may include a display device 1000 for displaying a user interface 1020 that may have a variety of information presented to the operator. For example, the display device 1000 may display the weight of an avian pullet at the vaccination position or the count of doses remaining for a particular injection device of the vaccine delivery assembly 400. Further, the user interface 1020 may display one or more icons 1040 capable of being actuated for initiating an operation of the vaccination system 1 or otherwise accessing additional functionality or icons. In some instance, the user interface 1020 may be a touchscreen interface with which the operator may touch to actuate the icons 1040.

Many modifications and other aspects of the present disclosure set forth herein will come to mind to one skilled in the art to which this disclosure pertains having the benefit of the teachings presented in the foregoing descriptions and the associated drawings. For example, the positioning device 600 and the carriage assembly 700 may be formed as a single unit. As described herein, the positioning device 600 and the carriage assembly 700 may be separable for various reasons, including ease of transport, replacement, cleaning, etc. Therefore, it is to be understood that the present disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A positioning device for presenting an avian bird, the positioning device comprising:
    a frame;
    a breast support bracket extending from the frame;
    a breast support operably engaged with the a breast support bracket and configured to support a breast of an avian bird, the breast support being orientated such that the head of the avian bird is positioned down and forward;
    a wing mount operably engaged with the frame above the breast support and configured to receive and retain the wings of the avian bird together above its back in a vertical orientation;
    a pair of leg support members operably engaged with the frame and configured to support and separate the legs of the avian bird;
    a pair of leg mounts operably engaged with the frame and positioned opposite the breast support with respect to the wing mount, the leg mounts being configured to receive and retain the legs of the avian bird; and
    wherein the breast support, wing mount, leg support members and leg mounts cooperate to entirely support and restrain an avian bird in a flight-replicated position.

2. A positioning device according to claim 1, wherein the breast support is saddle-shaped.

3. A positioning device according to claim 2, wherein the breast support comprises a discrete pair of breast support members.

4. A positioning device according to claim 1, wherein the wing mount comprises a pair of wing mount brackets, each wing mount bracket having a plurality of pliant members extending inwardly toward the other wing mount bracket so at to form opposing finger-like structures.

5. A positioning device according to claim 4, wherein at least one of the wing mount brackets is hinged to the frame such that the wing mount bracket is capable of rotating to release the wings from the wing mount when the frame is pivoted.

6. A positioning device according to claim 1, wherein each leg mount comprises a pair of leg mount brackets.

7. A positioning device according to claim 6, wherein each leg mount bracket has a plurality of pliant members extending inwardly toward the other associated leg mount bracket so at to form opposing finger-like structures configured to grip a leg of the avian bird.

8. A positioning device according to claim 1, further comprising a tube operably engaged with the frame below the wing mount, the tube being positioned to receive the head of the avian bird when it is positioned down and forward by the breast support.

9. A positioning device for presenting an avian bird, the positioning device comprising:
    a frame; and
    a plurality of positioning assemblies operably engaged with the frame and configured to entirely support and restrain an avian bird in a flight-replicated position, wherein at least one of the positioning assemblies is a wing mount having a plurality of pliant members configured to grip a wing of the avian bird.

10. A method of presenting an avian pullet, the method comprising:
    providing a positioning device configured to entirely support and restrain an avian pullet in a flight-replicated position, the positioning device comprising:
        a frame;
        a breast support operably engaged with the a breast support bracket and configured to support a breast of an avian pullet, the breast support being orientated such that the head of the avian pullet is positioned down and forward;
        a wing mount operably engaged with the frame above the breast support and configured to receive and retain the wings of the avian pullet together above its back in a vertical orientation;
        a pair of leg support members operably engaged with the frame and configured to support and separate the legs of the avian pullet; and
        a pair of leg mounts operably engaged with the frame and positioned opposite the breast support with respect to the wing mount, the leg mounts being configured to receive and retain the legs of the avian pullet; and
    positioning an avian pullet within the positioning device.

11. A method according to claim 10, wherein positioning an avian pullet within the positioning device further comprises positioning a breast of the avian pullet on a breast support having a pair of breast support members.

12. A method according to claim 10, wherein positioning an avian pullet within the positioning device further comprises positioning each leg of the avian pullet within a respective leg mount comprising a plurality of opposably arranged pliant members configured to grip a respective leg of the avian bird.

13. A method according to claim 10, wherein positioning an avian pullet within the positioning device further comprises positioning the wings of the avian pullet within the wing mount having a plurality of opposably arranged pliant members configured to grip and retain the wings of the avian pullet.

14. A method according to claim 10, wherein positioning an avian pullet within the positioning device further comprises positioning a head of the avian pullet within a tube operably engaged with the frame below the wing mount.

15. A method of presenting an avian pullet, the method comprising:
    providing a positioning device having a frame and a plurality of positioning assemblies operably engaged with the frame and configured to entirely support and restrain an avian pullet in a flight-replicated position, wherein at least one of the positioning assemblies is a wing mount having a plurality of pliant members configured to grip a wing of the avian pullet; and
    positioning an avian pullet within the positioning device, wherein the wings are positioned within the wing mount.

* * * * *